United States Patent
Lee et al.

(10) Patent No.: US 11,528,664 B2
(45) Date of Patent: Dec. 13, 2022

(54) DEVICE AND METHOD FOR CONTROLLING TRANSMISSION POWER OF ELECTRONIC DEVICE IN WIRELESS COMMUNICATION SYSTEM

(71) Applicant: Samsung Electronics Co., Ltd., Gyeonggi-do (KR)

(72) Inventors: Hyoungjoo Lee, Gyeonggi-do (KR); Wonsuk Chung, Gyeonggi-do (KR); Sangho Lee, Gyeonggi-do (KR); Hyejeong Kim, Gyeonggi-do (KR); Euichang Jung, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/734,146

(22) PCT Filed: Dec. 31, 2019

(86) PCT No.: PCT/KR2019/018790
§ 371 (c)(1),
(2) Date: Dec. 1, 2020

(87) PCT Pub. No.: WO2020/141852
PCT Pub. Date: Jul. 9, 2020

(65) Prior Publication Data
US 2021/0219240 A1 Jul. 15, 2021

(30) Foreign Application Priority Data
Jan. 2, 2019 (KR) .................. 10-2019-0000214

(51) Int. Cl.
*H04W 52/14* (2009.01)
*H04W 76/15* (2018.01)
(Continued)

(52) U.S. Cl.
CPC ......... *H04W 52/146* (2013.01); *H04W 52/36* (2013.01); *H04W 76/15* (2018.02); *H04W 88/06* (2013.01)

(58) Field of Classification Search
CPC . H04W 52/146; H04W 52/367; H04W 52/36; H04W 52/365; H04W 52/38; H04W 76/15; H04W 88/06
See application file for complete search history.

(56) References Cited

U.S. PATENT DOCUMENTS 7,881,722 B2 * 2/2011 Gunnarsson ...... H04W 72/0486
455/448
10,687,287 B2 * 6/2020 Lu ....................... H04W 52/346
(Continued)

FOREIGN PATENT DOCUMENTS

KR 1020160138544 12/2016
KR 101788479 10/2017

OTHER PUBLICATIONS

PCT/ISA/210 Search Report issued on PCT/KR2019/018790, dated Apr. 10, 2020, pp. 5.
(Continued)

*Primary Examiner* — John J Lee
(74) *Attorney, Agent, or Firm* — The Farrell Law Firm, P.C.

(57) ABSTRACT

The disclosure relates to a device and a method for controlling transmission power of an electronic device in a wireless communication system. An electronic device may include: a housing; at least one radio frequency integrated circuit (RFIC) disposed in the housing and configured to support a first radio access technology (RAT) and a second RAT; a first communication processor electrically or operationally connected to the at least one RFIC; a second communication processor electrically or operationally connected to the at least one RFIC and the first communication processor; and
(Continued)

at least one memory which is operationally connected to the first communication processor and the second communication process or is a part of at least one of the first communication processor or the second communication processor, and which is configured to store a first threshold value related to the at least one RFIC.

37 Claims, 18 Drawing Sheets

(51) Int. Cl.
  *H04W 52/36* (2009.01)
  *H04W 88/06* (2009.01)

(56) References Cited

U.S. PATENT DOCUMENTS

| | | |
|---|---|---|
| 2015/0215943 A1 | 7/2015 | Vajapeyam et al. |
| 2015/0282104 A1 | 10/2015 | Damnjanovic et al. |
| 2016/0242128 A1 | 8/2016 | Loehr et al. |
| 2017/0295568 A1 | 10/2017 | Takeda et al. |
| 2017/0310447 A1 | 10/2017 | Kusashima et al. |
| 2020/0404595 A1* | 12/2020 | Ohara .............. H04W 52/367 |
| 2021/0068059 A1* | 3/2021 | Yasukawa .......... H04W 52/247 |

OTHER PUBLICATIONS

PCT/ISA/237 Written Opinion issued on PCT/KR2019/018790, dated Apr. 10, 2020, pp. 7.

Huawei et al., "Remaining issues on EN-DC, NE-DC, and SUL", R1-1808930, 3GPP TSG RAN WG1 Meeting #94, Gothenburg, Sweden, Aug. 11, 2018, pp. 9.

LG Electronics, "Remaining Issues on NR LTE Coexistence", R1-1812550, 3GPP TSG RAN WG1 Meeting #95, Nov. 12-16, 2018, 6 pages.

Huawei, HiSilicon, "On NR EN-DC Dynamic Power Sharing", R4-1800422, 3GPP TSG-RAN WG4 Meeting AH 1801, Jan. 22-26, 2018, 3 pages.

3GPP, 3rd Generation Partnership Project; Technical Specification Group Radio Access Network; NR; Physical Layer Procedures for Control (Release 15), 3GPP TS 38.213 V15.2.0, Jun. 2018, 98 pages.

European Search Report dated Aug. 9, 2021 issued in counterpart application No. 19907382.6-1215, 12 pages.

* cited by examiner

FIG. 7A

| Uplink-Downlink Configuration | Downlink-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

… tion an electronic device (e.g. the second electronic device 302 in FIG. 3D) according to various embodiments;

FIG. 7A illustrates an example for describing the configuration of an uplink and a downlink in an LTE network;

DETAILED DESCRIPTION

Figure 1:
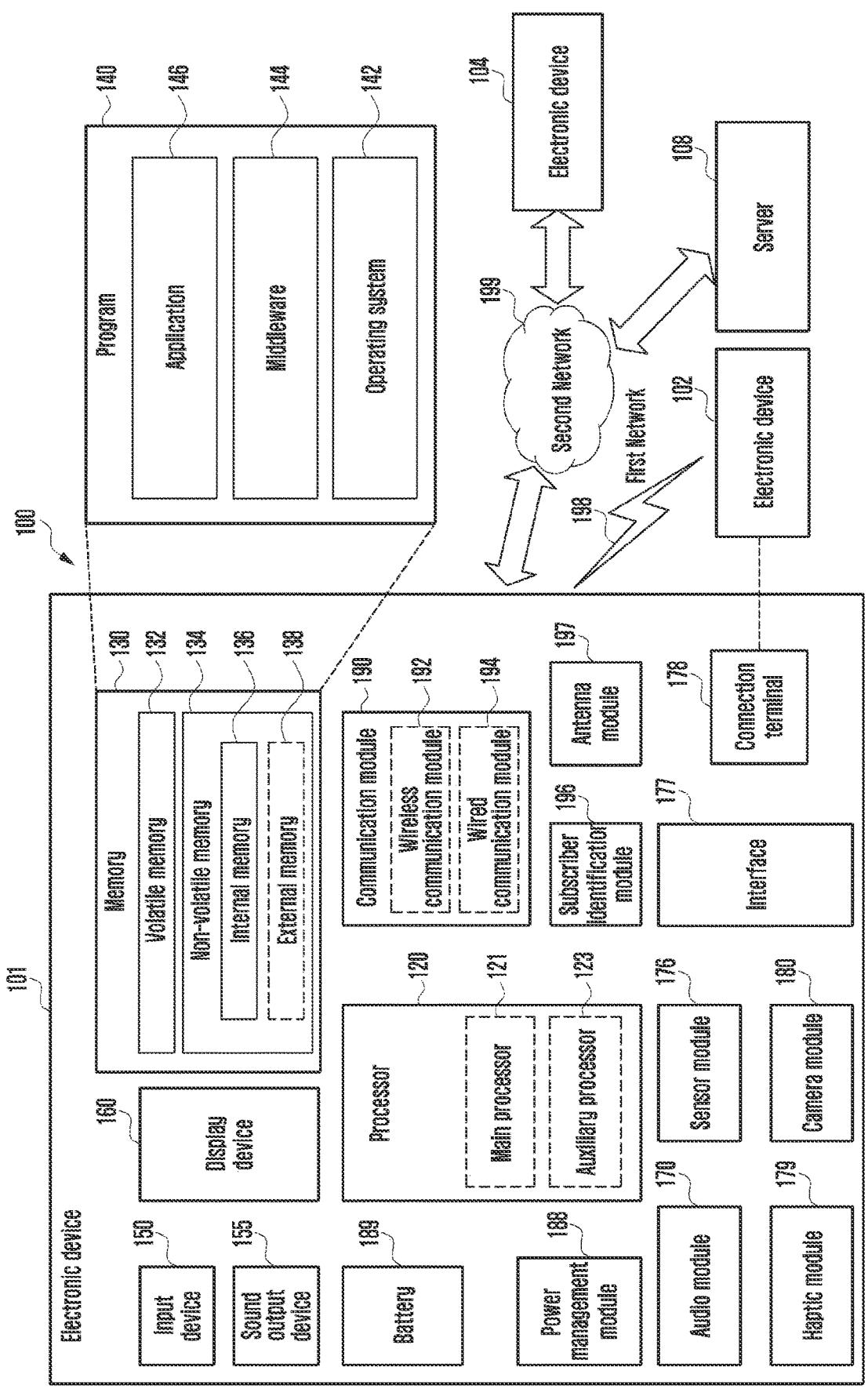

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

FIG. 1 is block diagram of an electronic device 101 in a network environment 100 according to various embodiments. Referring to FIG. 1, in the network environment 100, the electronic device 101 may communicate with an electronic device 102 via a first network 198 (e.g. a short-range wireless communication network), or may communicate with an electronic device 104 or a server 108 via a second network 199 (e.g. a long-range wireless communication network). According to one embodiment, the electronic device 101 may communicate with the electronic device 104 via the server 108. According to one embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In an embodiment, in the electronic device 101, at least one (e.g. the display device 160 or the camera module 180) of the elements may be omitted, or one or more other elements may be added. In an embodiment, some of the elements may be implemented as one integrated circuit. For example, the sensor module 176 (e.g. a fingerprint sensor, an iris sensor, or an illumination sensor) may be implemented to be embedded in the display device 160 (e.g. a display).

The processor 120, for example, may execute software (e.g. a program 140) to control at least one other element (e.g. hardware or a software element) of the electronic device 101, connected to the processor 120, and may perform various data processing or calculation. According to one embodiment, as at least a part of data processing or calculation, the processor 120 may load commands or data received from another element (e.g. the sensor module 176 or the communication module 190) to a volatile memory 132, may process the commands or data stored in the volatile memory 132, and may store result data in a nonvolatile memory 134. According to one embodiment, the processor 120 may include a main processor 121 (e.g. a central processing unit or an application processor) and an auxiliary processor 123 (e.g., a graphics processing unit, an image signal processor, a sensor hub processor, or a communication processor) that can operate independently from or together with the main processor 121. Additionally or alternatively, the auxiliary processor 123 may be configured to use lower power than the main processor 121, or to be specific to a designated function. The auxiliary processor 123 may be implemented separately from or as part of the main processor 121.

The auxiliary processor 123 may, for example, control at least some of functions or states associated with at least one (e.g. the display device 160, the sensor module 176, or the communication module 190) of the elements of the electronic device 101, in place of the main processor 121 while the main processor 121 is in an inactive (e.g. sleep) state or together with the main processor 121 while the main processor 121 is active (e.g. executes an application). According to one embodiment, the auxiliary processor 123 (e.g. an image signal processor or communication processor) may be implemented as part of another functionally related element (e.g. the camera module 180 or the communication module 190).

The memory 130 may store various data used by at least one element (e.g. the processor 120 or the sensor module 176) of the electronic device 101. The data may include, for example, software (e.g. the program 140) and input data or output data for a command related thereto. The memory 130 may include the volatile memory 132 or the nonvolatile memory 134.

The program 140 may be stored as software in the memory 130, and may include, for example, an operating system 142, middleware 144, or an application 146.

The input device 150 may receive a command or data to be used for an element (e.g. the processor 120) of the electronic device 101 from the outside (e.g. a user) of the electronic device 101. The input device 150 may include, for example, a microphone, a mouse, or a keyboard.

The sound output device 155 may output a sound signal to the outside of the electronic device 101. The sound output device 155 may include, for example, a speaker or a receiver. The speaker may be used for general purposes such as multimedia playback or recording playback, and the receiver may be used to receive an incoming call. According to one embodiment, the receiver may be implemented separately from or as part of a speaker.

The display device 160 may visually provide information to the outside (e.g. a user) of the electronic device 101. The display device 160 may include, for example, a display, a hologram device, or a projector and a control circuit for controlling the corresponding device. According to one embodiment, the display device 160 may include a touch circuitry configured to sense a touch, or a sensor circuit (e.g. a pressure sensor) configured to measure the strength of a force generated by the touch.

The audio module 170 may convert sound into an electrical signal or, conversely, convert an electrical signal into sound. According to one embodiment, the audio module 170 may acquire sound through the input device 150, or may output sound through the sound output device 155 or through an external electronic device (e.g. the electronic device 102 (e.g. a speaker or a headphone) directly or wirelessly connected to the electronic device 101.

The sensor module 176 may sense an operating state (e.g. power or temperature) of the electronic device 101 or an external environmental state (e.g. a user state), and may generate an electrical signal or data value corresponding to the sensed state. According to one embodiment, the sensor module 176 may include, for example, a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more designated protocols that may be used for the electronic device 101 to be directly or wirelessly connected to an external electronic device (e.g. the electronic device 102). According to one embodiment, the interface 177 may include, for example, a high definition multimedia interface (HDMI), a universal serial bus (USB) interface, an SD card interface, or an audio interface.

The connection terminal 178 may include a connector through which the electronic device 101 may be physically connected to an external electronic device (e.g. the electronic device 102). According to one embodiment, the connection terminal 178 may include, for example, an HDMI connector, a USB connector, an SD card connector, or an audio connector (e.g. a headphone connector).

The haptic module 179 may convert an electrical signal into a mechanical stimulus (e.g. vibration or movement) or an electrical stimulus that can be perceived by the user through tactile or kinesthetic senses. According to one embodiment, the haptic module 179 may include, for example, a motor, a piezoelectric element, or an electrical stimulation device.

The camera module 180 may capture still images and videos. According to one embodiment, the camera module 180 may include one or more lenses, image sensors, image signal processors, or flashes.

The power management module 188 may manage power supplied to the electronic device 101. According to one embodiment, the power management module 388 may be implemented, for example, as at least part of a power management integrated circuit (PMIC).

The battery 189 may supply power to at least one element of the electronic device 101. According to one embodiment, the battery 189 may include, for example, a non-rechargeable primary cell, a rechargeable secondary cell, or a fuel cell.

The communication module 190 may support the establishment of a direct (e.g. wired) communication channel or wireless communication channel between the electronic device 101 and an external electronic device (e.g. the electronic device 102, the electronic device 104, or the server 108), and may support communication via the established communication channel. The communication module 190 may operate independently of the processor 120 (e.g. an application processor), and may include one or more communication processors that support direct (e.g. wired) or wireless communication. According to one embodiment, the communication module 190 may include a wireless communication module 192 (e.g. a cellular communication module, a short-range wireless communication module, or a global navigation satellite system (GNSS) communication module) or a wired communication module 194 (e.g. a local area network (LAN) communication module or a power line communication module). The corresponding communication module of these communication modules may communicate with an external electronic device through the first network 198 (e.g. a short-range communication network such as Bluetooth, WiFi direct, or an infrared data association (IrDA)) or the second network 199 (e.g. a long-range communication network such as a cellular network, the Internet, or a computer network (e.g. LAN or WAN). These various types of communication modules may be integrated into one element (e.g. a single chip) or may be implemented by multiple separate elements (e.g. multiple chips). The wireless communication module 192 may use subscriber information (e.g. international mobile subscriber identifier (IMSI)) stored in the subscriber identification module 196 to identify and authenticate the electronic device 101 in a communication network, such as the first network 198 or the second network 199.

The antenna module 197 may transmit or receive a signal or power to or from the outside (e.g. an external electronic device). According to one embodiment, the antenna module may be formed of a conductive member or a conductive pattern. According to an embodiment, the antenna module may additionally include other elements (e.g. RFIC) in addition to the conductive member or conductive pattern. According to an embodiment, the antenna module 197 may include one or more antennas, from which at least one antenna suitable for a communication scheme used in a communication network, such as the first network 198 or the second network 199, may be, for example, selected by the communication module 190. The signal or power may be transmitted or received between the communication module 190 and the external electronic device through the selected at least one antenna.

At least some of the elements are connected to each other through a communication method between peripheral devices (e.g. a bus, a general purpose input and output (GPIO), a serial peripheral interface (SPI), or a mobile industry processor interface (MIPI)), and may exchange a signal (e.g. a command or data) with each other.

According to one embodiment, the command or data may be transmitted or received between the electronic device 101 and the external electronic device 104 through the server 108 connected to the second network 199. The type of each of the electronic devices 102 and 104 may be the same as or different from that of the electronic device 101. According to one embodiment, all or some of operations executed in the electronic device 101 may be executed in one or more external devices among the external electronic devices 102, 104, or 108. For example, when the electronic device 101 needs to perform a function or service automatically or in response to a request from a user or another device, the electronic device 101 may, instead of or in addition to executing the function or service by itself, request one or more external electronic devices to perform at least a part of the function or the service. The one or more external electronic devices that have received the request may execute at least a part of the requested function or service, or an additional function or service related to the request, and may transmit a result of the execution to the electronic device 101. The electronic device 101 may process the result as it is or additionally and provide the processed result as at least a part of a response to the request. To this end, for example, cloud computing, distributed computing, or client-server computing technology may be used.

Figure 2:
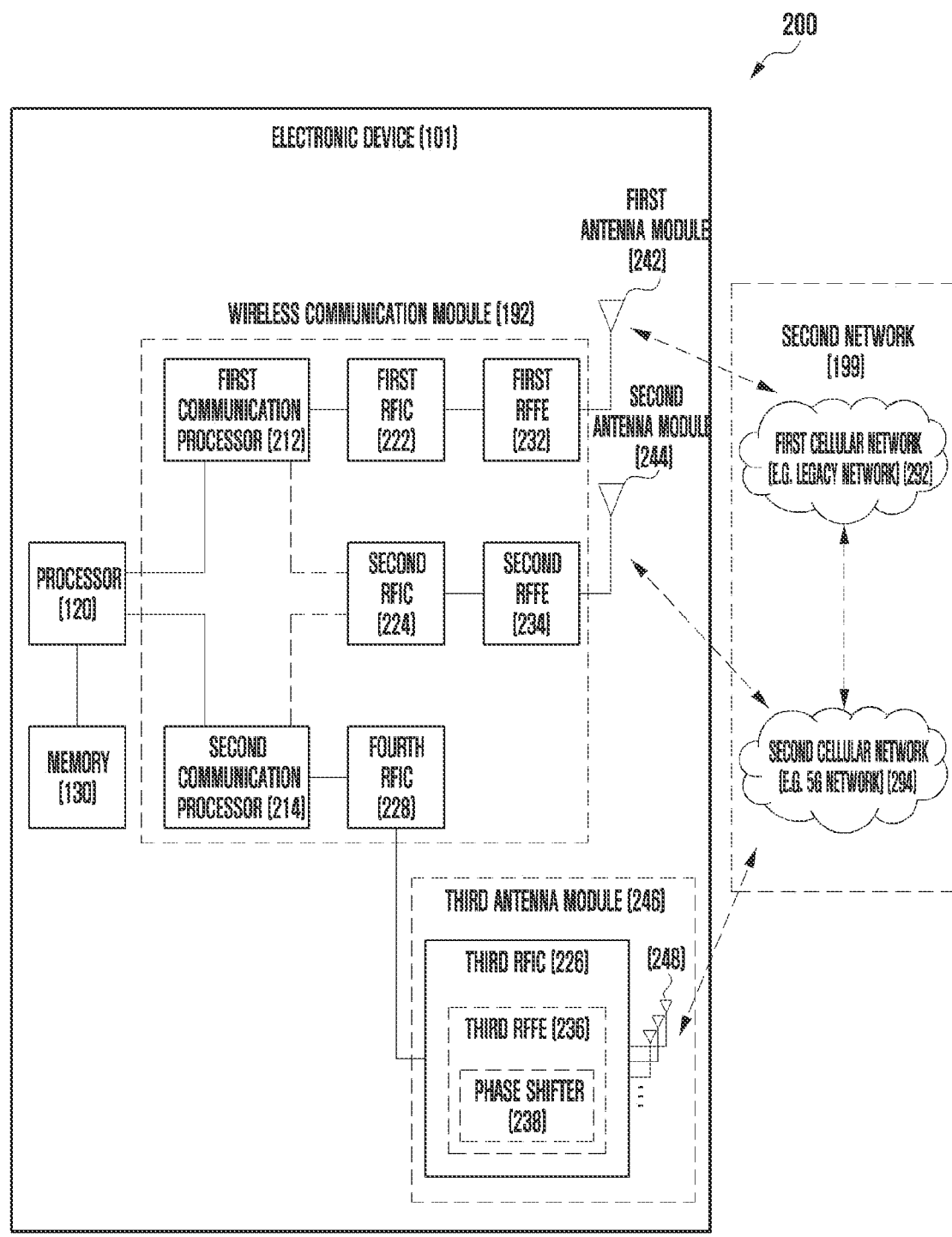

FIG. 2 is a block diagram 200 of the electronic device 101 in a network environment including multiple cellular networks according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one among the components illustrated in FIG. 1, and the second network 199 may further include at least one other network. According to one embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may establish a communication channel for a band to be used for wireless communication with the first cellular network 292, and may support legacy network communication through the established communication channel. According to various embodiments, the first network may be a legacy network including a 2G, 3G, 4G, or long-term-evolution (LTE) network. The second communication processor 214 may establish a communication channel corresponding to a band (e.g. from about 6 GHz to about 60 GHz) designated among bands to be used for wireless communication with the second cellular network 294, and may support 5G network communication through the established communication channel. According to various embodiments, the second cellular network 294 may be a 5G network defined in the 3GPP. Additionally, according to one embodiment, the first communication processor 212 or the second communication processor 214 may establish a communication channel corresponding to a band (e.g. about 6 GHz or less) designated among bands to be used for wireless communication with the second cellular network 294, and may support 5G network communication through the established communication channel. According to one embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to one embodiment, the first communication processor 212 or second communication processor 214 may be directly or indirectly connected to each other by an interface (not shown) so as to provide or receive data or a control signal in one direction or in both directions.

At the time of signal transmission, the first RFIC 222 may convert a baseband signal generated by the first communication processor 212 into a radio-frequency (RF) signal of about 700 MHz to about 3 GHz used for the first cellular network 292 (e.g. a legacy network). At the time of signal reception, an RF signal may be acquired from the first cellular network 292 (e.g. a legacy network) through an antenna (e.g. the first antenna module 242), and may be preprocessed through an RFFE (e.g. the first RFFE 232). The first RFIC 222 may convert the preprocessed RF signal into a baseband signal that can be processed by the first communication processor 212.

At the time of signal transmission, the second RFIC 224 may convert a baseband signal generated by the first communication processor 212 or the second communication processor 214 into an RF signal (hereinafter, referred to as a "5G Sub6 RF signal") of a Sub6 band (e.g. about 6 GHz or less) used for the second cellular network 294 (e.g. a 5G network). At the time of signal reception, a 5G Sub6 RF signal may be acquired from the second cellular network 294 (e.g. a 5G network) through an antenna (e.g. the second antenna module 244), and may be preprocessed through an RFFE (e.g. the second RFFE 234). The second RFIC 224 may convert the preprocessed 5G Sub6 RF signal into a baseband signal that can be processed by a corresponding communication processor among the first communication processor 212 or the second communication processor 214.

The third RFIC 226 may convert a baseband signal generated by the second communication processor 214 into an RF signal (hereinafter, referred to as a "5G Above6 RF signal") of a 5G Above6 band (e.g. from about 6 GHz to about 60 GHz) to be used in the second cellular network 294 (e.g. a 5G network). At the time of signal reception, a 5G Above6 RF signal may be acquired from the second cellular network 294 (e.g. a 5G network) through an antenna (e.g. the antenna 248), and may be preprocessed through the third RFFE 236. The third RFIC 226 may convert the preprocessed 5G Above6 RF signal into a baseband signal that can be processed by the second communication processor 214. According to one embodiment, the third RFFE 236 may be formed as a part of the third RFIC 226.

According to one embodiment, the electronic device 101 may include the fourth RFIC 228 separately from the third RFIC 226 or as at least a part thereof. The fourth RFIC 228 may convert a baseband signal generated by the second communication processor 214 into an RF signal of an intermediate frequency band (e.g. from about 9 GHz to about 11 GHz) (hereinafter, referred to as an "IF signal"), and may then transmit the IF signal to the third RFIC 226. The third RFIC 226 may convert the IF signal into a 5G Above6 RF signal. At the time of signal reception, a 5G Above6 RF signal may be received from the second cellular network 294 (e.g. a 5G network) through an antenna (e.g. the antenna 248), and may be converted into an IF signal by the third RFIC 226. The fourth RFIC 228 may convert the IF signal into a baseband signal that can be processed by the second communication processor 214.

According to one embodiment, the first RFIC 222 and the second RFIC 224 may be implemented as at least a part of a single package or a single chip. According to one embodiment, the first RFFE 232 and the second RFFE 234 may be implemented as at least a part of a single package or a single chip. According to one embodiment, at least one antenna module among the first antenna module 242 or the second antenna module 244 may be omitted, or may be combined with the other antenna module to process RF signals of multiple bands corresponding thereto.

According to one embodiment, the third RFIC 226 and the antenna 248 may be arranged on the same substrate to form a third antenna module 246. For example, the wireless communication module 192 or the processor 120 may be arranged on a first substrate (e.g. a main PCB). In this instance, the third antenna module 246 may be formed by arranging the third RFIC 226 in a partial area (e.g. a lower surface) of a second substrate (e.g. a sub PCB) independent of the first substrate and arranging the antenna 248 in another partial area (e.g. an upper surface) thereof. Arranging the third RFIC 226 and the antenna 248 on the same substrate can reduce the length of a transmission line therebetween. This arrangement may reduce, for example, the loss (e.g. attenuation) of a signal in a high-frequency band (e.g. from about 6 GH to about 60 GHz), used for 5G network communication, due to the transmission line. Therefore, the electronic device 101 may enhance the quality or speed of communication with the second cellular network 294 (e.g. a 5G network).

According to one embodiment, the antenna 248 may be formed as an antenna array including multiple antenna elements which can be used for beamforming. In this instance, for example, the third RFIC 226 may include, as a part of the third RFFE 236, multiple phase shifters 238 corresponding to the multiple antenna elements. At the time of signal transmission, each of the multiple phase shifters 238 may shift the phase of a 5G Above6 RF signal to be transmitted from the electronic device 101 to the outside (e.g. a base station in a 5G network) through an antenna element corresponding thereto. At the time of signal reception, each of the multiple phase shifters 238 may shift the phase of a 5G Above6 RF signal received from the outside through an antenna element corresponding thereto into an identical or substantially identical phase. This enables transmission or reception through beamforming between the electronic device 101 and the outside.

The second cellular network 294 (e.g. a 5G network) may be operated independently of the first cellular network 292 (e.g. a legacy network) (e.g. standalone (SA)) or may be operated while being connected to the first network (e.g. non-standalone (NSA)). For example, the 5G network may include only an access network (e.g. a 5G radio access network (RAN) or next-generation RAN (NG RAN)), and may not include a core network (e.g. a next-generation core (NGC) network). In this instance, the electronic device 101 may access the access network of the 5G network and may then access an external network (e.g. the Internet) under the control of a core network (e.g. an evolved packed core (EPC) network) of the legacy network. Protocol information (e.g. LTE protocol information) for communication with the legacy network or protocol information (e.g. new radio (NR) protocol information) for communication with the 5G network may be stored in a memory 130, and may be accessed by another component (e.g. the processor 120 in FIG. 1, or the first communication processor 212 or the second communication processor 214 in FIG. 2).

Figure 3A:
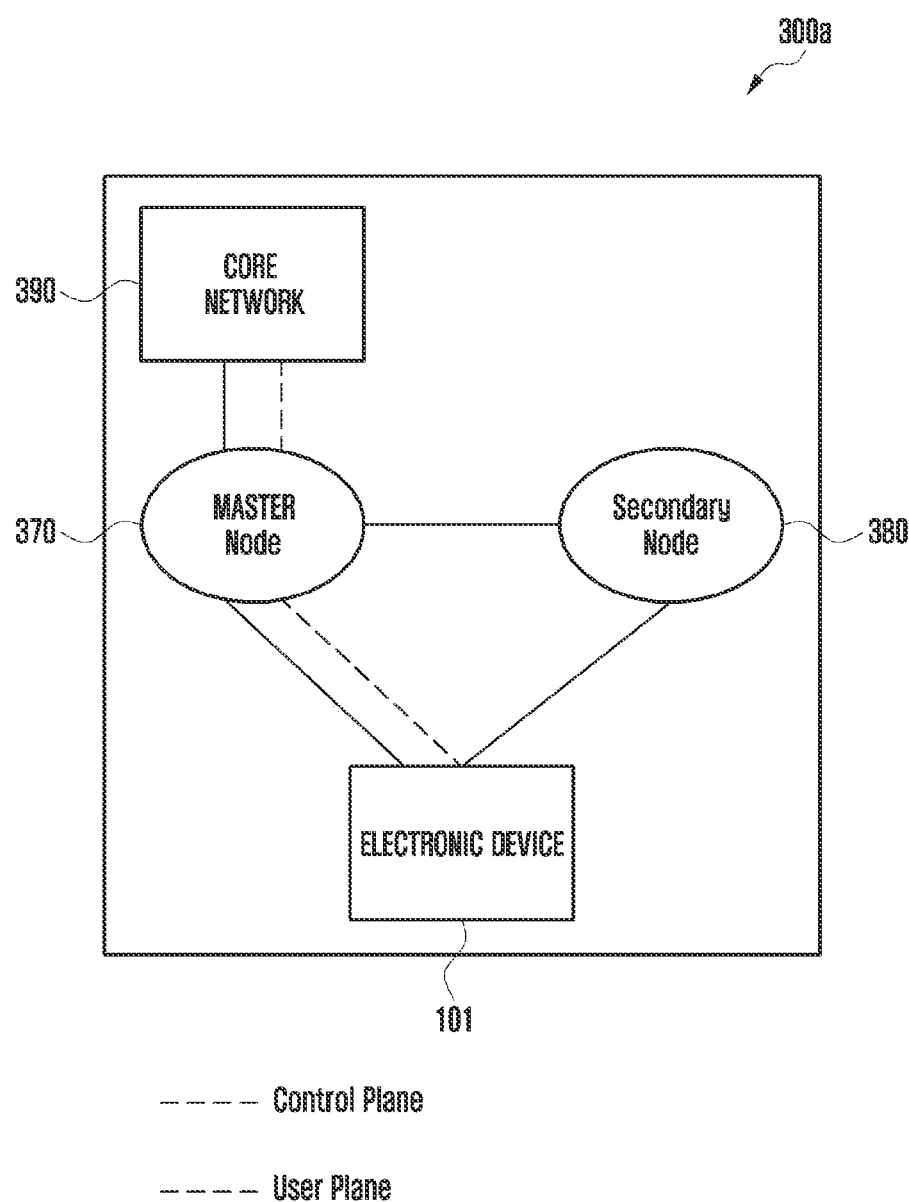
Figure 3B:
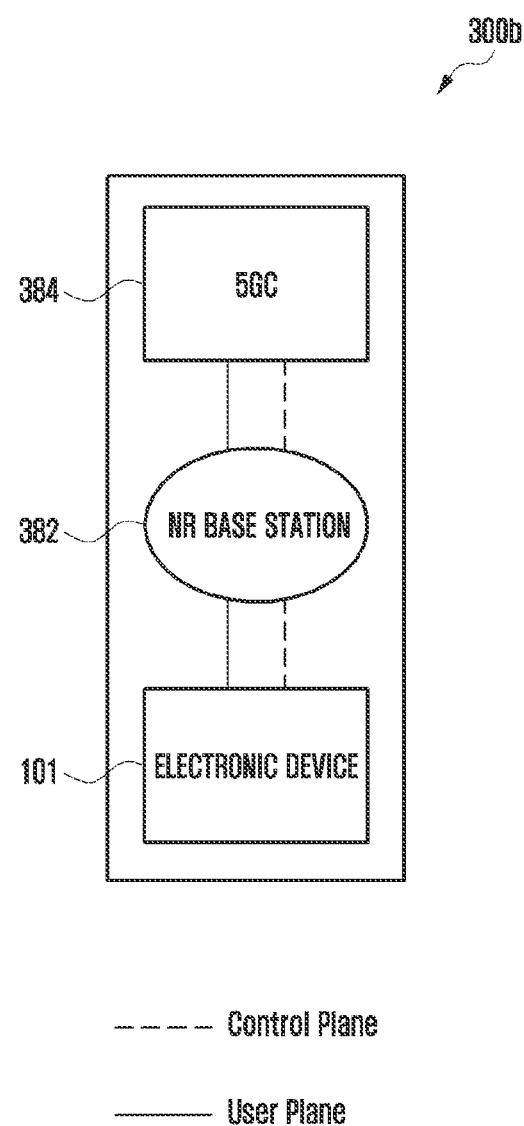
Figure 3C:
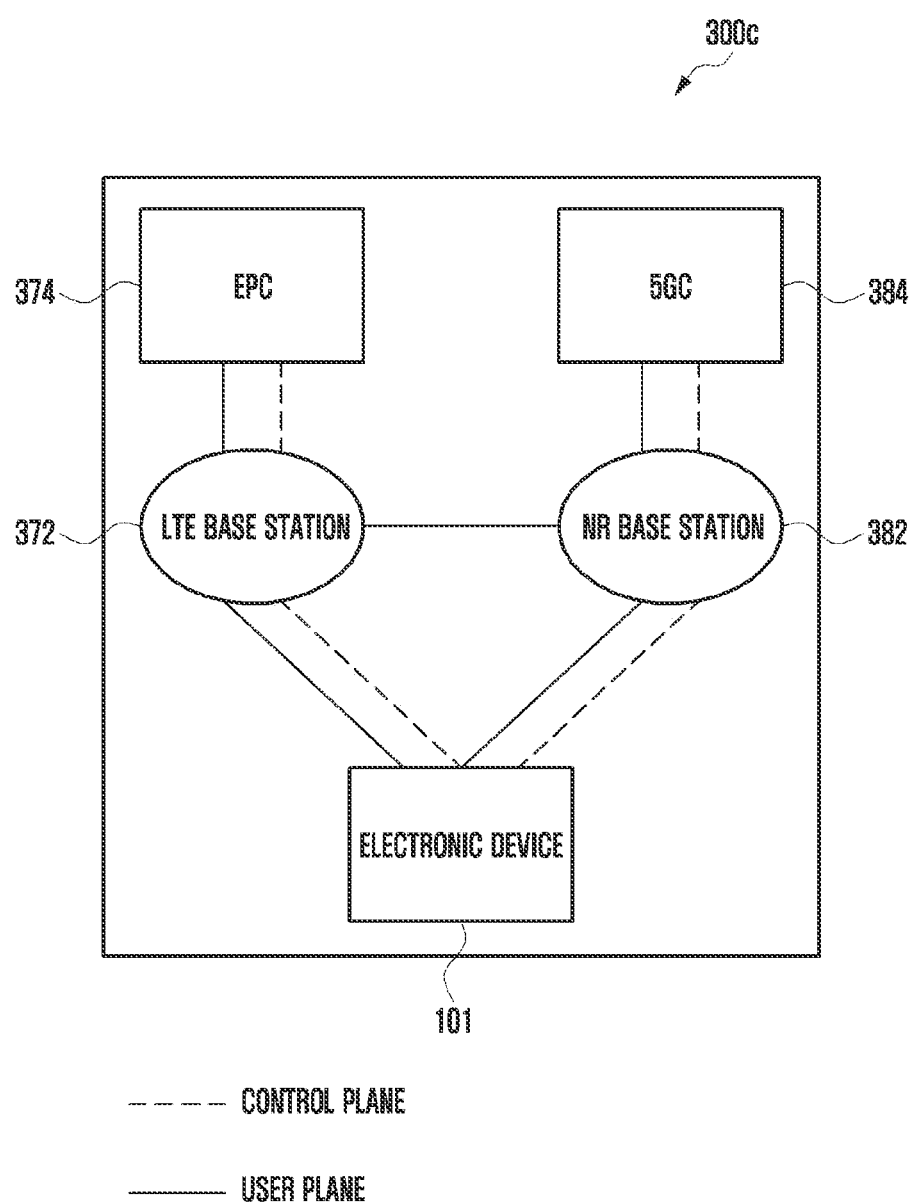

FIGS. 3A to 3C illustrate wireless communication systems for providing legacy communication and/or 5G communication networks according to various embodiments. Referring to FIGS. 3A to 3C, network environments 300a to 300c may include at least one of a legacy network and a 5G network. The legacy network may include, for example, the electronic device 101, a 4G or LTE base station 372 (e.g. an eNB (eNodeB)) of the 3GPP standard, which supports radio access, and an evolved packet core (EPC) 374 which manages 4G communication. The 5G network may include, for example, the electronic device 101, a new radio (NR) base station 2382 (e.g. gNB (gNodeB)) which supports radio access, and a 5th generation core 5GC 384 which manages 5G communication of the electronic device 101.

According to various embodiments, the electronic device 101 may transmit or receive a control message and user data through legacy communication and/or 5G communication. The control message may include a message related to at least one among, for example, security control, bearer setup, authentication, registration, or mobility management of the electronic device 101. The user data may refer to, for example, user data excluding a control message transmitted and received between the electronic device 101 and a core network 390 (e.g. the EPC 374).

Referring to FIG. 3A, the electronic device 101 according to one embodiment may use at least a part (e.g. the LTE base station 372 or the EPC 374) of the legacy network to transmit or receive at least one of the control message or the user data to or from at least a part (e.g. the NR base station 382 or the 5GC 384) of the 5G network.

According to various embodiments, the network environment 300a may include a network environment which provides a wireless communication dual connectivity (DC) to the LTE base station 372 and the NR base station 382 and transmits or receives a control message to or from the electronic device 101 through the core network 390 of one of EPC 374 or 5GC 384.

According to various embodiments, in a DC environment, one of the LTE base station 372 or the NR base station 382 may operate as a master node (MN) 370, and the other thereof may operate as a secondary node (SN) 380. The MN 370 may be connected to the core network 390 and may transmit or receive a control message. The MN 370 and the SN 380 may be connected to each other through a network interface so as to transmit or receive a message related to the management of a wireless resource (e.g. a communication channel).

According to various embodiments, the MN 370 may be configured as the LTE base station 372, the SN 380 may be configured as the NR base station 382, and the core network 390 may be configured as the EPC 374. For example, a control message may be transmitted or received via the LTE base station 372 and the EPC 374, and user data may be transmitted or received via the LTE base station 372 and the NR base station 382.

According to various embodiments, the MN 370 may be configured as the NR base station 382, the SN 380 may be configured as the LTE base station 372, and the core network 390 may be configured as the 5GC 384. For example, a control message may be transmitted or received via the LTE base station 372 and the EPC 374, and user data may be transmitted or received via the LTE base station 372 and the NR base station 382.

Referring to FIG. 3B, according to various embodiments, the 5G network may include the NR base station 382 and the 5GC 384, and may transmit or receive a control message and user data independently of the electronic device 101.

Referring to FIG. 3C, each of the legacy network and the 5G network according to various embodiments may independently provide data transmission or reception. For example, the electronic device 101 and the EPC 374 may transmit or receive a control message and user data to or from each other via the LTE base station 372. In another example, the electronic device 101 and the 5GC 384 may transmit or receive a control message and user data to or from each other via the NR base station 382.

According to various embodiments, the electronic device 101 may be registered in at least one of the EPC 374 or 5GC 384 and may transmit or receive a control message.

According to various embodiments, the EPC 374 or 5GC 384 may manage communication of electronic device 101 while interworking with each other. For example, movement information of the electronic device 101 may be transmitted or received via the interface between the EPC 374 and the 5GC 384.

Figure 3D:
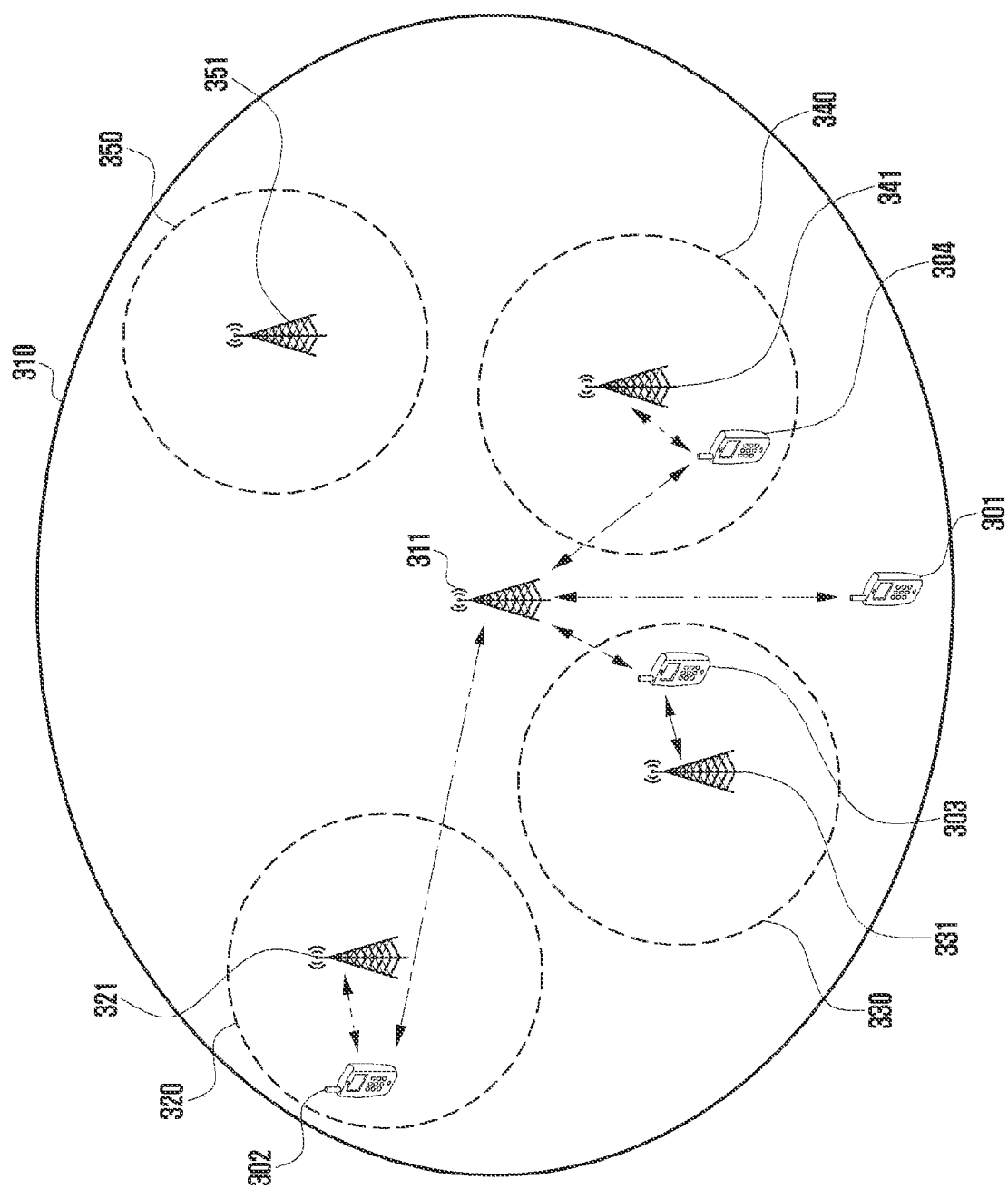

FIG. 3D is a conceptual view illustrating a network, in which a base station 311 in an LTE network and base stations 321, 331, 341, and 351 in an NR network coexist, and electronic devices 301, 302, 303, and 304 belong thereto according to various embodiments.

Referring to FIG. 3D, the different multiple base stations 311, 321, 331, 341, and 351 are illustrated as an embodiment. According to one embodiment, the first base station 311 may have a wider communication coverage 310 than the other base stations 321, 331, 341, and 351. The first base station 311, which has wider communication coverage 310 than the other base stations 321, 331, 341, and 351, may become a base station in an LTE network. In general, a base station in the LTE network may use a lower frequency band than the base stations 321, 331, 341, and 351 in a 5G network. According to one embodiment, the first base station 311 in the LTE network may have a radio frequency (RF) of about 700 MHz to about 3 GHz as a communication frequency band. According to one embodiment, the base stations 321, 331, 341, and 351 in the 5G network may perform communication by using a first radio frequency band, which is a radio frequency (RF) band of about 6 GHz to about 60 GHz, as a communication frequency band, and may perform communication in a second radio frequency band of 6 GHz or less. Since the first base station 311 in the LTE network has a lower frequency band than the base stations 321, 331, 341, and 351 in the 5G network, as described above, the communication coverage 310 of the first base station 311 in the LTE network may be wider than respective communication coverages 320, 330, 340, and 350 of the base stations 321, 331, 341, and 351 in the NR network.

FIG. 3D illustrates four different electronic devices 301, 302, 303, and 304. All the four different electronic devices 301, 302, 303, and 304 illustrated in FIG. 3D may have the elements illustrated FIGS. 1 and 2 or at least some thereof. According to one embodiment, all the four different electronic devices 301, 302, 303, and 304 are positioned within the first communication coverage 310 of the first base station 311, and thus may communicate with the first base station 311 which is an LTE base station. According to one embodiment, when the four different electronic devices 301, 302, 303, and 304 belong to the base stations 321, 331, 341, and 351 in the 5G network, respectively, the four different electronic devices 301, 302, 303, and 304 may communicate with the corresponding base stations in the 5G network.

According to one embodiment, the first electronic device 301 may be included in the first communication coverage 310 of the first base station 311 and may not be doubly included in any of the base stations 321, 331, 341, and 351 in the 5G network. In this case, the first electronic device 301 may communicate with the first base station 311 in an LTE scheme.

According to one embodiment, the second electronic device 302 may be positioned in a second communication coverage 320 of the second base station 321 in the 5G network while being positioned within the first communication coverage 310 of the first base station 311 which is an LTE base station. In this case, the second electronic device 302 may communicate with the second base station 321 in the 5G network while communicating with the first base station 311, which is an LTE base station, in an LTE scheme. According to another embodiment, the second electronic device 302 may communicate with one of the first base station 311, which is an LTE base station, or the second base station 321 in the 5G network in an LTE scheme or in a 5G scheme.

Similarly, the third electronic device 303 may be positioned in a third communication coverage 330 of the third base station 331 in the 5G network while being positioned within the first communication coverage 310 of the first base station 311 which is an LTE base station. In this case, the third electronic device 303 may communicate with the third base station 331 in the 5G network while communicating with the first base station 311, which is an LTE base station, in an LTE scheme. According to another embodiment, the third electronic device 303 may communicate with one of the first base station 311, which is an LTE base station, or the third base station 331 in the 5G network in an LTE scheme or in a 5G scheme.

Similarly, the fourth electronic device 304 may be positioned in a fourth communication coverage 340 of the fourth base station 341 in the 5G network while being positioned within the first communication coverage 310 of the first base station 311 which is an LTE base station. In this case, the fourth electronic device 304 may communicate with the fourth base station 341 in the 5G network while communicating with the first base station 311, which is an LTE base station, in an LTE scheme. According to another embodiment, the fourth electronic device 304 may communicate with one of the first base station 311, which is an LTE base station, or the fourth base station 341 in the 5G network in an LTE scheme or in a 5G scheme.

In the example illustrated in FIG. 3D, the second electronic device 302 may be positioned at a cell boundary or cell edge of the first base station 311. The third electronic device 303 may be positioned in an area adjacent to the first base station 311. The fourth electronic device 304 may be positioned closer to the first base station 311 than the second electronic device 302, and may be positioned further away from the first base station 311 than the third electronic device 303. In FIG. 3D, if there is no propagation path loss due to buildings, mountains, low hills, artificial obstacles, or natural obstacles, the first base station 311 may allocate the smallest amount of power to the third electronic device 303 among the electronic devices communicating with the first base station 311 and/or may provide the highest transmission rate to the third electronic device 303. Under the same assumption, the first base station 311 may allocate the largest amount of power to the second electronic device 302 and/or may provide the lowest transmission rate to the second electronic device 302.

According to one embodiment, when communicating with the electronic devices 301, 302, 303, and 304, the first base station 311, which is an LTE base station, may perform the communication through an LTE frequency division duplexing (LTE FDD), or may perform the communication through LTE time division duplexing (LTE TDD). According to various embodiments, the first base station 311 may be a base station which supports only the LTE FDD. According to another embodiment, the first base station 311 may be a base station which supports only the LTE TDD.

According to one embodiment, the electronic devices 301, 302, 303, and 304 may support both the LTE FDD and the LTE TDD. According to one embodiment, when the electronic devices 301, 302, 303, and 304 support both the LTE FDD and the LTE TDD and communicate with the first base station 311, which is an LTE base station, through the TDD, the electronic devices 301, 302, 303, and 304 may also perform communication with a 5G base station through the TDD. When the electronic devices 301, 302, 303, and 304 communicate with the 5G base station through the TDD as described above, the electronic devices 301, 302, 303, and 304 may perform uplink power control according to the TDD. According to another embodiment, when the electronic devices 301, 302, 303, and 304 communicate with the first base station 311, which is an LTE base station, through the FDD, the electronic devices 301, 302, 303, and 304 may also communicate with the 5G base station through the FDD. When the electronic devices 301, 302, 303, and 304 communicate with the 5G base station through the FDD as described above, the electronic devices 301, 302, 303, and 304 may perform uplink power control according to the FDD.

According to one embodiment, the electronic devices 301, 302, 303, and 304 may support only one of the LTE FDD and the LTE TDD. According to one embodiment, when the electronic devices 301, 302, 303, and 304 communicate with the first base station 311, which is an LTE base station, through the TDD, the electronic devices 301, 302, 303, and 304 may also communicate with the second base station 321 to the fifth base station 351, which are 5G base stations, through the TDD. When the electronic devices 301, 302, 303, and 304 communicate with the first base station 311 and the 5G base stations through the TDD, the electronic devices 301, 302, 303, and 304 may perform uplink power control according to the TDD.

According to another embodiment, when the electronic devices 301, 302, 303, and 304 communicate with the first base station 311, which is an LTE base station, through the TDD, the electronic devices 301, 302, 303, and 304 may also communicate with the second base station 321 to the fifth base station 351, which are 5G base stations, through the TDD. When the electronic devices 301, 302, 303, and 304 communicate with the first base station 311 and the 5G base stations through the FDD as described above, the electronic devices 301, 302, 303, and 304 may perform dynamic uplink power control according to the FDD.

According to various embodiments, the second electronic device 302 may be positioned at a cell boundary or cell edge of the first base station 311. When the second electronic device 302 positioned at the boundary or cell edge is required to perform uplink transmission to the first base station 311, the second electronic device 302 may allocate the maximum transmission power, which can be used by the second electronic device 302, to uplink transmission to the first base station 311. In this case, since the second electronic device 302 cannot allocate power to be transmitted to uplink transmission to the second base station 321, the second electronic device 302 may not perform the uplink transmission to the second base station 321. According to one embodiment, the second electronic device 302 positioned at the cell boundary or cell edge of the first base station 311 may perform communication through the TDD in order to perform uplink transmission to the first base station 311 and the second base station 321.

According to various embodiments, the third electronic device 303 may be positioned adjacent to the first base station 311. The third electronic device 303 adjacent to the first base station 311 may have sufficient maximum transmission power which the third electronic device 303 can allocate when the uplink transmission to the first base station 311 is required. In this case, the third electronic device 303 may allocate power to be transmitted to uplink transmission to the third base station 331. According to one embodiment, the third electronic device 303, which is close to the first base station 311 or has a communication channel in a good condition, may perform communication through the FDD, and may use a dynamic power allocation method.

Figure 4:
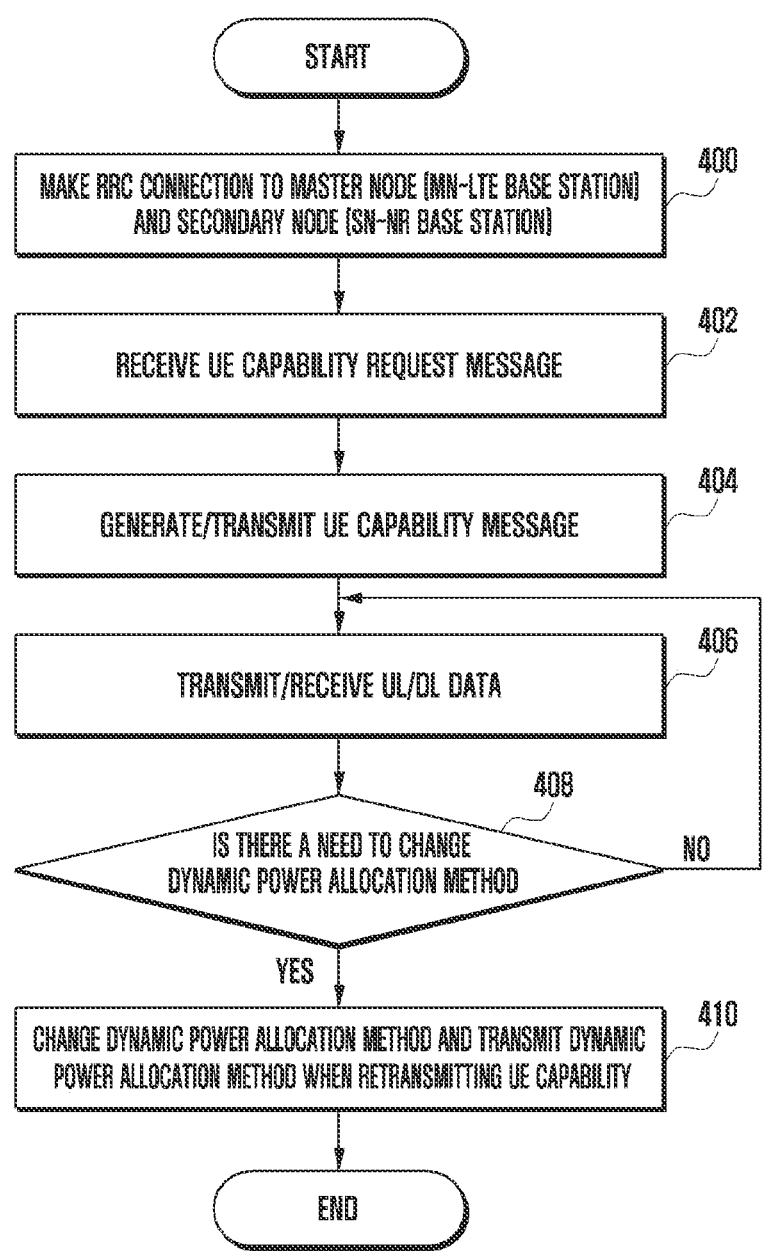

FIG. 4 is a flowchart illustrating control at the time of transmission and reception of data in an electronic device (e.g. the second electronic device 302 in FIG. 3D) according to various embodiments.

Before a description is made with reference to FIG. 4, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, the flowchart in FIG. 4 may relate to an operation of an electronic device in an E-UTRA NR dual connectivity (EN-DC) environment, in which the first network is an LTE network and the second network is an NR network. In the following embodiments, a description will be made of the operation of the electronic device in the EN-DC environment in order to facilitate detailed understanding of the MR-DC environment. However, a person skilled in the art may identically apply the operation in the EN-DC environment to the MR-DC environment.

Referring to FIG. 4, according to various embodiments, in operation 400, the second electronic device 302 may establish an RRC connection to a master node (MN), for example, a first base station (e.g. the first base station 311 in FIG. 3D) which is an LTE network. Further, in operation 400, the second electronic device 302 may establish an RRC connection to a secondary node (SN), for example, a second base station (e.g. the second base station 321 in FIG. 3D) which is a 5G network. According to one embodiment, although not illustrated, the second electronic device 302 may first perform an RRC connection to the first base station 311, and then may perform an RRC connection to the second base station 321. According to another embodiment, the second electronic device 302 may simultaneously perform the RRC connection to the first base station 311 and the RRC connection to the second base station 321.

According to various embodiments, in operation 400, the second electronic device 302 may store, in a memory (e.g. the memory 130 in FIG. 2), at least one of: received-signal strength information (e.g. received signal received power (RSRP), signal interference noise ratio (SINR), received signal strength indicator (RSSI), or received signal received quality (RSRQ)), which has been received from the first base station 311; and transmission power information (e.g. transmission power of a preamble, transmission power of random access channel (RACH) Msg-3, transmission power of a physical uplink control channel (PUCCH), transmission power of a physical uplink shard channel (PUSCH)), which the second electronic device 302 has transmitted to the first base station 311. According to one embodiment, when a dynamic power allocation method is applied, it is possible to use the received signal strength information and the transmission power information of a network, stored by the second electronic device 302.

In operation 402, the second electronic device 302 may receive an electronic device capability (UE capability) request message (e.g. UE capability enquiry) from the first base station 311 which is an LTE base station. According to one embodiment, each of the first electronic devices 301, the second electronic device 302, the third electronic device 303, and the fourth electronic device 304 may receive an electronic device capability (UE capability) request message from the first base station 311 which is an LTE base station. According to another embodiment, each of the second electronic device 302, the third electronic device 303, and the fourth electronic device 304 may receive an electronic device capability (UE capability) request message from a 5G network base station, to which the same belongs, among 5G network base stations.

According to one embodiment, although not illustrated, each of the first electronic device 301, the second electronic device 302, the third electronic device 303, and the fourth electronic device 304 may receive an electronic device capability (UE capability) request message from the first base station 311 which is an LTE base station, and then may receive an electronic device capability (UE capability) request message from a 5G network base station, to which the same belongs, among the 5G network base stations. According to another embodiment, each of the first electronic device 301, the second electronic device 302, the third electronic device 303, and the fourth electronic device 304 may simultaneously receive an electronic device capability (UE capability) request message from the first base station 311, which is an LTE base station, and an electronic device capability (UE capability) request message from a 5G network base station, to which the same belongs, among the 5G network base station.

When the electronic device capability (UE capability) request message is received, in operation 404, the second electronic device 302 may generate an electronic device capability (UE capability) message (e.g. UE capability information) in response thereto, and may transmit the generated message to a corresponding base station. According to one embodiment, when the second electronic device 302 receives an electronic device capability (UE capability) request message from the first base station 311 which is an LTE network, the second electronic device 302 may generate an electronic device capability (UE capability) message and may transmit the electronic device capability (UE capability) message to the first base station 311. According to another embodiment, when the second electronic device 302 receives an electronic device capability (UE capability) request message from the second base station 321 which is a 5G network, the second electronic device 302 may generate an electronic device capability (UE capability) message and may transmit the electronic device capability (UE capability) message to the second base station 321. Similarly, when electronic device capability (UE capability) request messages are received from the third base station 331 and the fourth base station 341 which are 5G network base stations and to which the third electronic device 303 and the fourth electronic device 304 belong, respectively, the third electronic device 303 and the fourth electronic device 304 may generate electronic device capability (UE capability) messages thereof and may transmit the electronic device capability (UE capability) messages to the corresponding base stations, respectively.

According to one embodiment, although not illustrated, the second electronic device 302 may transmit an electronic device capability (UE capability) message to the first base station 311, and then may generate an electronic device capability (UE capability) message and transmit the generated electronic device capability (UE capability) message to the second base station 321 which is a 5G network. According to another embodiment, the second electronic device 302 may simultaneously transmit electronic device capability (UE capability) messages to both the first base station 311 which is an LTE network and the second base station 321 which is a 5G network.

According to one embodiment, the second electronic device 302 may configure a dynamic power allocation (dynamic power sharing) method in an electronic device capability (UE capability) message. For example, the second electronic device 302 may determine whether or not to use the dynamic power allocation method, based on the received signal strength information, received from the first base station 311, and the transmission power information, transmitted to the first base station 311, which have been stored in the memory 130 in operation 400. According to another embodiment, when the first base station 311 has been configured in a TDD scheme, the second electronic device 302 may transmit an electronic device capability (UE capability) message to the first base station 311 without configuring the dynamic power allocation (dynamic power sharing) method in the electronic device capability message.

According to one embodiment, the dynamic power allocation method may be greatly advantageous when an electronic device in an EN-DC environment is positioned in a weak electric field area of the first base station 311. For example, when the second electronic device 302 positioned in an LTE weak electric field communicates with the first base station 311, power necessary for uplink transmission may be the maximum transmission power or may have a value close to the maximum transmission. There may be the case in which the second electronic device 302 positioned in the LTE weak electric field must perform uplink transmission to the second base station 321, which is a 5G base station, at the same time point as the time point of performing uplink transmission with the first base station 311. When the second electronic device 302 simultaneously performs uplink transmission with both the first base station 311 and the second base station 321, as described above, the second electronic device 302 may perform the uplink transmission with the second base station 321 by only power remaining after excluding transmission power allocated to the uplink transmission to the first base station 311. On such an occasion as this, the second electronic device 302 has allocated most of transmission power to the uplink transmission of the first base station 311, and thus, in many cases, power to be allocated to the second base station 321 may not exist or may have a very small value. In this case, the second electronic device 302 may be configured so as not to use the dynamic power allocation method. When uplink transmission power cannot be allocated to the second base station 321 which may have higher transmission rate, as described above, TDD-type power allocation may be better for the second electronic device 302.

In another embodiment, when an electronic device (e.g. the third electronic device 303 in FIG. 3D) is close to the first base station 311, there may be no problem with power allocation even when the third electronic device 303 simultaneously performs uplink transmission with both the first base station 311 and the second base station 321. When there is, as described above, no problem with power allocation even when the third electronic device 303 simultaneously performs uplink transmission with both the first base station 311 and the second base station 321, the third electronic device 303 may use the dynamic power allocation method.

According to one embodiment, when the dynamic power allocation method is used, in operation 404, the second electronic device 302 may generate an electronic device capability (UE capability) message and may transmit the electronic device capability (UE capability) message to the first base station 311 which is an LTE network and/or to the second base station 321 which is an NR network. When generating the electronic device capability (UE capability) message, the second electronic device 302 may configure whether to use the dynamic power allocation method in the electronic device capability (UE capability) message. According to one embodiment, the second electronic device 302 may determine whether to use the dynamic power allocation method by using a new field or a reserved field in the electronic device capability (UE capability) message.

According to one embodiment, in operation 406, the second electronic device 302 may perform downlink (DL)/uplink (UL) data transmission/reception, based on the dynamic power allocation method configured in the electronic device capability (UE capability) message. According to one embodiment, when TDD is used as a method for downlink/uplink data transmission/reception with the first base station 311 and the second base station 321, the second electronic device 302 may perform power control according to a TDD power allocation method. According to another embodiment, when FDD is used as a method for downlink/uplink data transmission/reception with the first base station 311 and the second base station 321, the second electronic device 302 may control uplink transmission power by using the dynamic power allocation method.

In operation 408, the third electronic device 303 may determine whether there is a need to change the use of the dynamic power allocation method. According to one embodiment, there may be a need for the second electronic device 302 to replace dynamic power allocation in use with a TDD power allocation method. For example, the second electronic device 302, which has been a short distance from the first base station 311 or has been in a good channel state, may move to the cell edge or cell boundary of the first base station 311 or be an extremely poor channel state. According to another embodiment, there may be a need for the second electronic device 302 to replace a TDD power allocation method in use with a dynamic power allocation method. For example, a state in which the second electronic device 302, which is positioned the cell edge or cell boundary of the first base station 311 or is in an extremely poor channel state, may switch to a state in which the second electronic device 302 is a short distance from the first base station 311 or is in a good state.

When it is determined, in operation 408, that there is a need to change the dynamic power allocation method (408—YES), the second electronic device 302 may perform operation 410. When operation 410 is performed, the second electronic device 302 may generate a new electronic device capability (UE capability) message, may change information on the use of the dynamic power allocation method, and may transmit the electronic device capability (UE capability) message when the transmission of the electronic device capability (UE capability) message is required. For example, in a case of needing to re-access a cell after cell release or transmit a tracking area update (TAU) message, or in a case of needing to transmit an electronic device capability (UE capability) message as in radio link failure (RLF), an electronic device capability (UE capability) message, which has changed the dynamic power allocation method, may be transmitted to a base station.

According to one embodiment, when the power allocation method is not required to be changed (408→NO) as a result of determining, in operation 408, whether the power allocation method is required to be changed, the second electronic device 302 may maintain operation 406.

Figure 5:
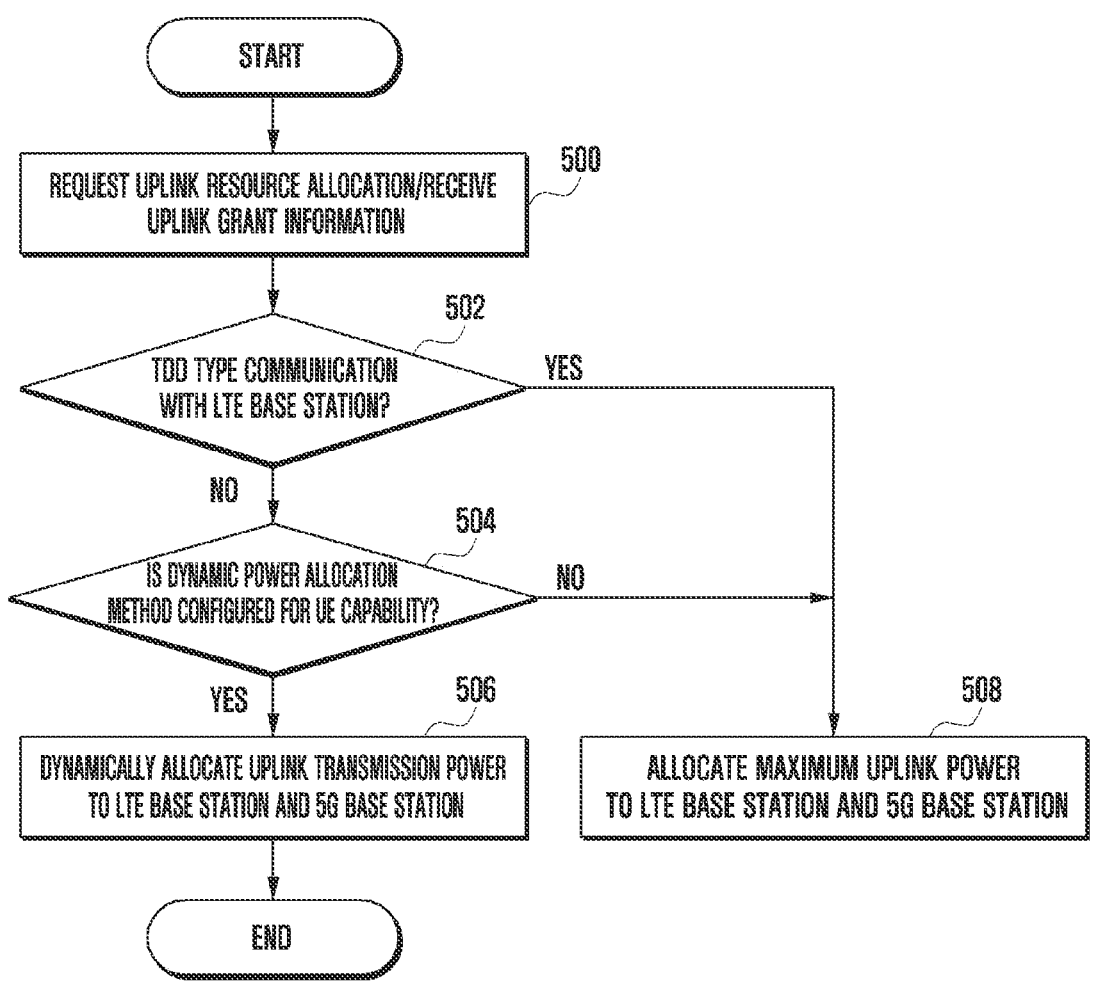

FIG. 5 is a flowchart illustrating control at the time of uplink resource allocation and transmission power allocation in an electronic device (e.g. the second electronic device 302 in FIG. 3D) according to various embodiments.

Before a description is made with reference to FIG. 5, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, the flowchart in FIG. 5 may relate to an operation of an electronic device in an E-UTRA NR dual connectivity (EN-DC) environment, in which the first network is an LTE network and the second network is an NR network. In the following embodiments, a description will be made of the operation of the electronic device in the EN-DC environment in order to facilitate detailed understanding of the MR-DC environment. However, a person skilled in the art may identically apply the operation in the EN-DC environment to the MR-DC environment The operations in FIG. 5 may be a flowchart of one embodiment for uplink resource allocation and transmission power allocation in operation 406 of FIG. 4.

Referring to FIG. 5, in operation 500, the second electronic device 302 may generate respective uplink (UL) resource allocation request messages to be transmitted to an LTE base station (e.g. the first base station 311 in FIG. 3D) which is a master node (MN) and to a 5G base station (e.g. the second base station 321 in FIG. 3D) which is a secondary node (SN), and may transmit the respective uplink resource allocation request messages to the first base station 311 and the second base station 321. In response thereto, on the basis of the uplink resource allocation request messages, the first base station 311 and the second base station 321 may generate uplink grant messages and transmit the uplink grant messages to the second electronic device 302. Thus, the second electronic device 302 may be allocated a resource necessary for uplink transmission, based on uplink grant information.

In operation 502, the second electronic device 302 may determine whether a communication scheme has been configured such that the second electronic device 302 communicates with the first base station 311, which is an LTE base station, in a TDD scheme. According to one embodiment, operation 502 may correspond to the case in which the communication scheme has been configured as a TDD scheme through an RRC message from the first base station 311 when the first base station 311, which is an LTE base station, supports only an LTE TDD scheme in operation 400 described above. In this case, in operation 502, the second electronic device 302 may determine whether the communication scheme is a TDD scheme by using resource allocation scheme information stored after being received in advance from the first base station 311 through the RRC message. According to another embodiment, in operation 502, when the second electronic device 302 transmits an electronic device capability (UE capability) message to the first base station 311 and receives a message, instructing the second electronic device 302 to use a TDD scheme, from the first base station 311, the second electronic device 302 may determine to communicate with the an LTE base station in the TDD scheme. In this case, operation 502 may be an operation in which the second electronic device 302 determines the resource allocation scheme received from the first base station 311. According to another embodiment, the second electronic device 302 may support only a TDD scheme. When the second electronic device 302 supports only the TDD scheme as described above, the second electronic device 302 may directly move to operation 508 from operation 502 and/or from operation 500.

As a result of the determination in operation 502, when the first base station 311, which is an LTE base station, is configured to communicate with the second electronic device 302 in the TDD scheme (502—YES), the second electronic device 302 may perform operation 508. In operation 508, the second electronic device 302 may configure, as the maximum transmission power, uplink transmission power to be transmitted to the first base station 311 which is an LTE base station and to the second base station 321 which is a 5G base station. According to one embodiment, when the second electronic device 302 is a mobile communication terminal and maximum uplink transmission power is 23 dBm, the second electronic device 302 may use, in operation 508, all of the transmission power of 23 dBm at the time of transmission of data and/or a control signal to the first base station 311 through an uplink. According to one embodiment, when the second electronic device 302 is a mobile communication terminal and maximum uplink transmission power is 23 dBm, the second electronic device 302 may use, in operation 508, all of the transmission power of 23 dBm at the time of transmission of data and/or a control signal to the second base station 321 through an uplink.

According to one embodiment, as a result of the determination in operation 502, when the first base station 311 which is an LTE base station is configured to communicate with the second electronic device 302 in an FDD scheme (502→NO), the second electronic device 302 may perform operation 504. According to one embodiment, in operation 504, the second electronic device 302 may determine whether a dynamic power allocation method has been configured in the electronic device capability (UE capability) message described in operation 404 of FIG. 4 described above. According to one embodiment, when the dynamic power allocation method has been configured (504→YES), the second electronic device 302 may perform operation 506. Further, when the dynamic power allocation method has not been configured (504→NO), the second electronic device 302 may perform operation 508.

According to one embodiment, in operation 506, the second electronic device 302 may dynamically allocate the uplink transmission power to the first base station 311 which is an LTE base station and to the second base station 321 which is a 5G base station. For example, when the second electronic device 302 is a mobile communication terminal, maximum uplink transmission power is 23 dBm, and the second electronic device 302 is required to simultaneously perform uplink transmission to the first base station 311 and the second base station 321, the second electronic device 302 may dynamically allocate transmission power to be transmitted to the first base station 311 and the second base station 321, based on a required data transfer rate and required transmission power.

Figure 6:
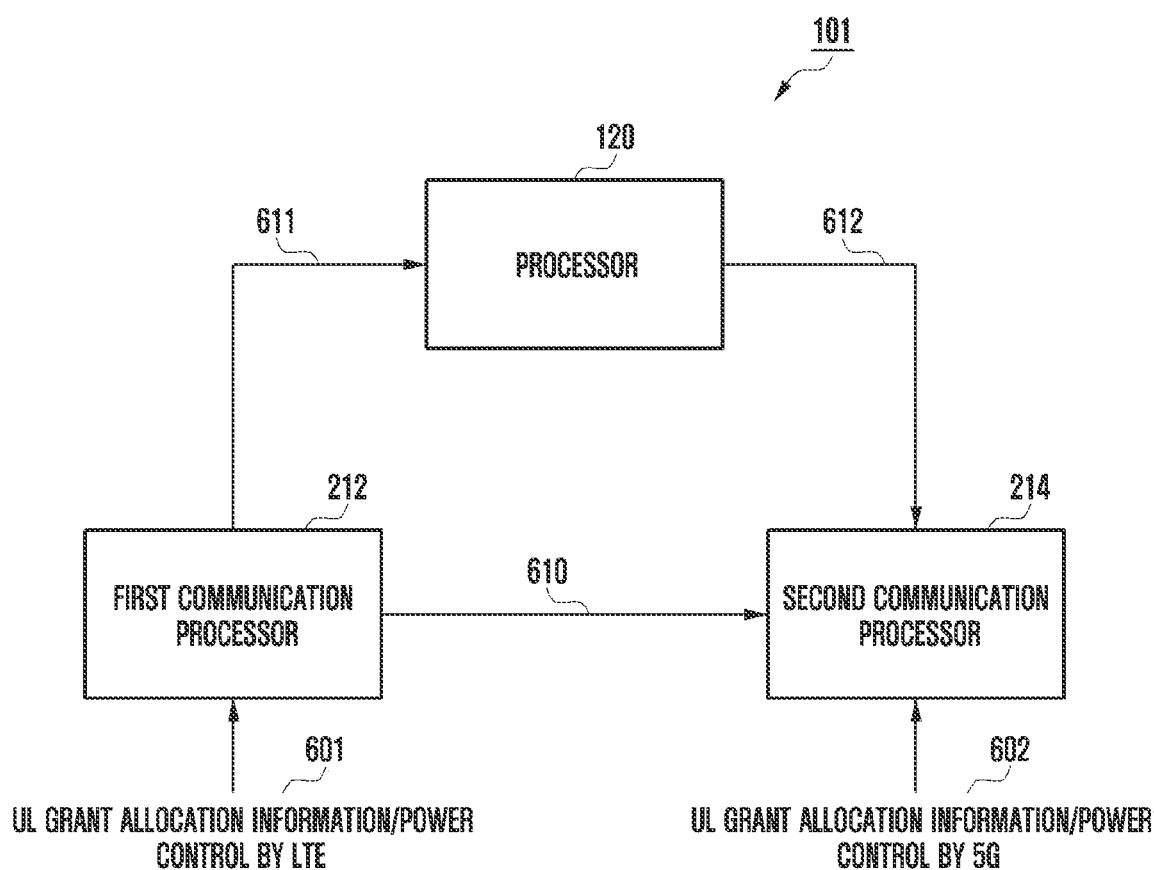
FIG. 6 illustrates only elements for controlling uplink transmission power in an electronic device (e.g. the second electronic device 302 in FIG. 3D) according to various embodiments.

FIG. 6 illustrates only elements for controlling uplink transmission power in an electronic device (e.g. the electronic device 101 in FIG. 1 or 2) according to various embodiments.

Before a description is made with reference to FIG. 6, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, the electronic device in FIG. 6 may be an electronic device operating in an E-UTRA NR dual connectivity (EN-DC) environment, in which the first network is an LTE network and the second network is an NR network. In the following embodiments, a description will be made of, for example, the operation of the electronic device in the EN-DC environment in order to facilitate detailed understanding of the MR-DC environment. However, a person skilled in the art may identically apply the operation in the EN-DC environment to the MR-DC environment.

The electronic device in FIG. 6 may be a mobile communication electronic device, and may be each of the electronic devices 301, 302, 303, and 304 illustrated in FIG. 3D. Referring to FIG. 6, the electronic device 101 may include the first communication processor 212, the second communication processor 214, and the processor 120. According to one embodiment, the first communication processor 212 and the second communication processor 214 may be separate chips or separate circuit elements as illustrated in FIG. 6. According to another embodiment, the first communication processor 212 and the second communication processor 214 may be formed as one chip. According to one embodiment, the first communication processor 212 may be configured to perform control for transmitting and receiving a control signal and/or data to and from a first base station (e.g. the first base station 311 in FIG. 3D). According to one embodiment, the first communication processor 212 may receive an electronic device capability (UE capability) request message, and, in response thereto, may generate an electronic device capability (UE capability) message and transmit the electronic device capability (UE capability) message to the first base station 311. According to one embodiment, the first communication processor 212 may generate an uplink resource allocation request message and transmit the uplink resource allocation request message to the first base station 311. The first communication processor 212 may receive a power control message 601 and an uplink grant allocation message which the first base station 311 has transmitted to the second electronic device 302 in response to the uplink resource allocation request message.

According to one embodiment, the second communication processor 214 may be configured to perform control for transmitting and receiving a control signal and/or data to and from a second base station (e.g. the second base station 321 in FIG. 3D). According to one embodiment, the second communication processor 214 may receive an electronic device capability (UE capability) request message, and, in response thereto, may generate an electronic device capability (UE capability) message and transmit the electronic device capability (UE capability) message to the second base station 321. According to one embodiment, the second communication processor 214 may generate an uplink resource allocation request message and transmit the uplink resource allocation request message to the second base station 321. The second communication processor 214 may receive a power control message 602 and an uplink grant allocation message which the second base station 321 has transmitted to the second electronic device 302 in response to the uplink resource allocation request message.

According to various embodiments, the processor 120 of the electronic device 101 may control uplink transmission power transmitted to the first base station 311 and the uplink transmission power transmitted to the second base station 321. According to one embodiment, the processor 120 may receive the uplink grant allocation message and the power control message 601 from the first communication processor 212, and may provide the same to the second communication processor 214. According to another embodiment, the processor 120 may receive the uplink grant allocation message and the power control message 601 from the first communication processor 212, and may receive the uplink grant allocation message and the power control message 602 from the second communication processor 214. When the processor 120 receives, as described above, the respective uplink grant allocation messages and the power control messages 601 and 602 from the first communication processor 212 and the second communication processor 214, the processor 120 may provide power allocation information to each of the first communication processor 212 and the second communication processor 214.

According to various embodiments, the first communication processor 212 of the electronic device 101 may control uplink power transmitted to the first base station 311 and uplink power transmitted to the second base station 321. In one embodiment, in the 5G communication protocol which defines an EN-DC environment, communication of the first base station 311 which is an LTE base station may have a priority, and the second base station 321 which is a 5G base station may have a lower priority than the first base station 311. According to one embodiment, the first communication processor 212 may determine uplink transmission power to be transmitted to the first base station 311 and uplink power to be transmitted to the second base station 321. Thus, the first communication processor 212 may provide the second communication processor 214 with the determined transmission power to be transmitted to the second base station 321.

According to another embodiment, the first communication processor 212 may determine uplink transmission power to be transmitted to the first base station 311, and may transmit, to the second communication processor 214, the determined uplink transmission power to be transmitted to the first base station 311. Thus, the second communication processor 214 may calculate power to be transmitted to the second base station 321 by using the difference between a threshold value of maximum power available for uplink transmission and the transmission power allocated to the first base station 311. For example, a threshold value of maximum power, which can be allocated by the electronic device 101, is 23 dB, and the first communication processor 212 may allocate 18 dB to the uplink transmission power to be transmitted to the first base station 311. In this case, the first communication processor 212 may transmit information on 18 dB allocated to the uplink to the second communication processor 214. In this case, since the second communication processor 214 recognizes that the threshold value of maximum power is 23 dB, the second communication processor 214 may allocate transmission power to the uplink within a range of 5 dB which is a value obtained by subtracting 18 dB allocated by the first communication processor 212 from 23 dB which is the threshold value of maximum power. According to one embodiment, the threshold value of maximum power may be a value stored in a memory (e.g. the memory 130 in FIG. 1 or 2).

According to another embodiment, the first communication processor 212 may determine uplink transmission power to be transmitted to the first base station 311, and may provide the second communication processor 214 with the determined transmission power value to be the first base station 311 and additional information, for example, margin information together. Thus, the second communication processor 214 may calculate power to be transmitted to the second base station 321 by using a difference obtained by subtracting the margin value and the transmission power value allocated to the first base station 311 from the maximum power available for uplink transmission. For example, a threshold value of maximum power, which can be allocated by the electronic device 101, is 23 dB, and the first communication processor 212 may allocate 18 dB to uplink transmission power to be transmitted to the first base station 311. Further, 2 dB may be configured as a margin. In this case, the first communication processor 212 may transmit, to the second communication processor 214, information on each of 18 dB allocated to the uplink and 2 dB corresponding to margin information or on the sum of the two values. In this case, the second communication processor 214 may recognize that the threshold value of maximum power is 23 dB, and may receive a value obtained by adding 18 dB allocated by the first communication processor 212 to 2 dB corresponding to the margin. Thus, the second communication processor 214 may allocate transmission power to the uplink within a range of 3 dB that is a value obtained by subtracting the sum of 18 dB allocated by the first communication processor 212 and 2 dB corresponding to the margin from 23 dB which is the threshold value of maximum power.

According to another embodiment, the first communication processor 212 may determine uplink transmission power to be transmitted to the first base station 311, and may provide the second communication processor 214 with a value obtained by subtracting the uplink transmission power to be transmitted to the first base station 311 from the maximum power which the second electronic device 302 can use for uplink transmission. Thus, the second communication processor 214 may allocate a power value, provided from the first communication processor 212, to uplink transmission power to be transmitted to the second base station 321. For example, a threshold value of maximum power, which can be allocated by the electronic device 101, is 23 dB, and the first communication processor 212 may allocate 18 dB to the uplink transmission power to be transmitted to the first base station 311. In this case, the first communication processor 212 may transmit, to the second communication processor 214, information on 5 dB that is a value obtained by subtracting 18 dB allocated to the uplink from 23 dB which is the threshold value of maximum power. In this case, the second communication processor 214 may allocate transmission power to the uplink within 5 dB received from the first communication processor 212.

According to another embodiment, the first communication processor 212 may determine uplink transmission power to be transmitted to the first base station 311, and may provide the second communication processor 214 with a power value obtained by additionally subtracting a margin value from a value that is obtained by subtracting the uplink transmission power to be transmitted to the first base station 311 from the maximum power which the second electronic device 302 can use for uplink transmission. Thus, the second communication processor 214 may allocate the power value, provided from the first communication processor 212, to uplink transmission power to be transmitted to the second base station 321. For example, a threshold value of maximum power, which can be allocated by the electronic device 101, is 23 dB, and the first communication processor 212 may allocate 18 dB to the uplink transmission power to be transmitted to the first base station 311. Further, 2 dB may be configured as a margin. In this case, the first communication processor 212 may transmit, to the second communication processor 214, information on 3 dB that is a value obtained by subtracting 18 dB allocated to the uplink and 2 dB corresponding to the margin information from 23 dB which is the threshold value of maximum power. In this case, the second communication processor 214 may allocate transmission power to the uplink within 3 dB received from the first communication processor 212.

According to various embodiments, when the dynamic power allocation method is used, the electronic device 101 may determine uplink transmission power to be transmitted to the first base station 311 and uplink transmission power to be transmitted to the second base station 321 for each subframe. According to one embodiment, when the processor 120 determines uplink transmission power to be transmitted to the first base station 311 and uplink transmission power to be transmitted to the second base station 321, the determination may be performed for each subframe of LTE. According to another embodiment, when the first communication processor 212 determines uplink transmission power to be transmitted to the first base station 311 and uplink transmission power to be transmitted to the second base station 321, the determination may be performed for each subframe of LTE.

According to various embodiments, in the case in which the dynamic power allocation method is used, the electronic device 101 may be configured to change the maximum value of transmission power to be allocated to an uplink to the first base station 311 and the maximum value of transmission power to be allocated to an uplink to the second base station 321 when the uplink transmission power to be allocated to the first base station 311 and the uplink transmission power to be transmitted to the second base station 321 satisfy a predetermined condition. For example, although an allowable power value of the first base station 311, which is an LTE network, has been configured as 20 dBm, when the transmission power value of the LTE network is required to be 21 dBm in an actual operation and it is determined that much trouble is not caused even when the second base station 321, which is a 5G network, uses transmission power lower than 21 dB, respective maximum allowable power values of the first base station 311 and the second base station 321 may be changed into 21 dBm and 17 dBm. According to one embodiment, the processor 120 may change maximum transmission power to be allocated to the uplink to the first base station 311, based on various types of information received from the first communication processor 212. Thus, the processor 120 may change maximum transmission power to be allocated to the uplink to the second base station 321. When the processor 120 changes the maximum transmission power to be allocated to the uplink to the first base station 311, the processor 120 may instruct the first communication processor 212 to update the maximum transmission power to be allocated to the uplink to the first base station 311, and may instruct the second communication processor 214 to update the maximum transmission power to be allocated to the uplink to the second base station 321.

According to another embodiment, the first communication processor 212 may change the maximum transmission power to be allocated to the uplink to the first base station 311, based on various types of information, such as power control information provided from the first base station 311, the amount of information stored in a transmission buffer, or the urgency of information to be transmitted. Thus, the first communication processor 212 may change the maximum transmission power to be allocated to the uplink to the second base station 321. When the first communication processor 212 changes the maximum transmission power to be allocated to the uplink to the first base station 311, the first communication processor 212 may instruct the second communication processor 214 to update the maximum transmission power to be allocated to the uplink to the second base station 321.

FIG. 7A illustrates an example for describing the configuration of an uplink and a downlink in an LTE network.

Before a description is made with reference to FIG. 7A, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, FIG. 7A illustrates, as an example of the MR-DC environment, an E-UTRA NR dual connectivity (EN-DC) environment in which the first network is an LTE network and the second network is an NR network. However, a person skilled in the art may identically apply the operation in the EN-DC environment to the MR-DC environment.

The LTE standard specification defines an uplink-downlink configuration in a TDD mode, as illustrated in FIG. 7A. Referring to FIG. 7A, a first column 710 exemplifies uplink-downlink configuration #0, uplink-downlink configuration #1, uplink-downlink configuration #2, uplink-downlink configuration #3, uplink-downlink configuration #4, uplink-downlink configuration #5, and uplink-downlink configuration #06, which are defined in the LTE standard specification, and a second column 720 defines a time of downlink-uplink switch-point periodicity, defined in the LTE standard specification, for each uplink-downlink configuration.

Uplink-downlink configurations #0-2 and uplink-downlink configuration #6 have downlink-uplink switch-point periodicity of 5 ms, and uplink-downlink configurations #3-5 have downlink-uplink switch-point periodicity of 10 ms. A third column 730 distinguishably defines downlink (D), uplink (U), and special(S) subframes according to the order of the subframes.

According to one embodiment, as in reference sign 711, uplink-downlink configuration #0 may have downlink-uplink switch-point periodicity of 5 ms, and may include subframes, the order of which is "D, S, U, U, U, D, S, U, U, and U" from a $0^{th}$ subframe to a $9^{th}$ subframe. According to another embodiment, as in reference sign 712, uplink-downlink configuration #6 may have downlink-uplink switch-point periodicity of 5 ms, and may include subframes, the order of which is "D, S, U, U, D, S, U, U, and D" from a $0^{th}$ subframe to a $9^{th}$ subframe. As described above, the LTE standard specification may variously configure the number of downlinks and uplinks depending on different uplink-downlink configurations, thereby setting uplink-downlink configurations so as to be adaptable to the amount of data transmitted through an uplink and downlink.

Figure 7B:
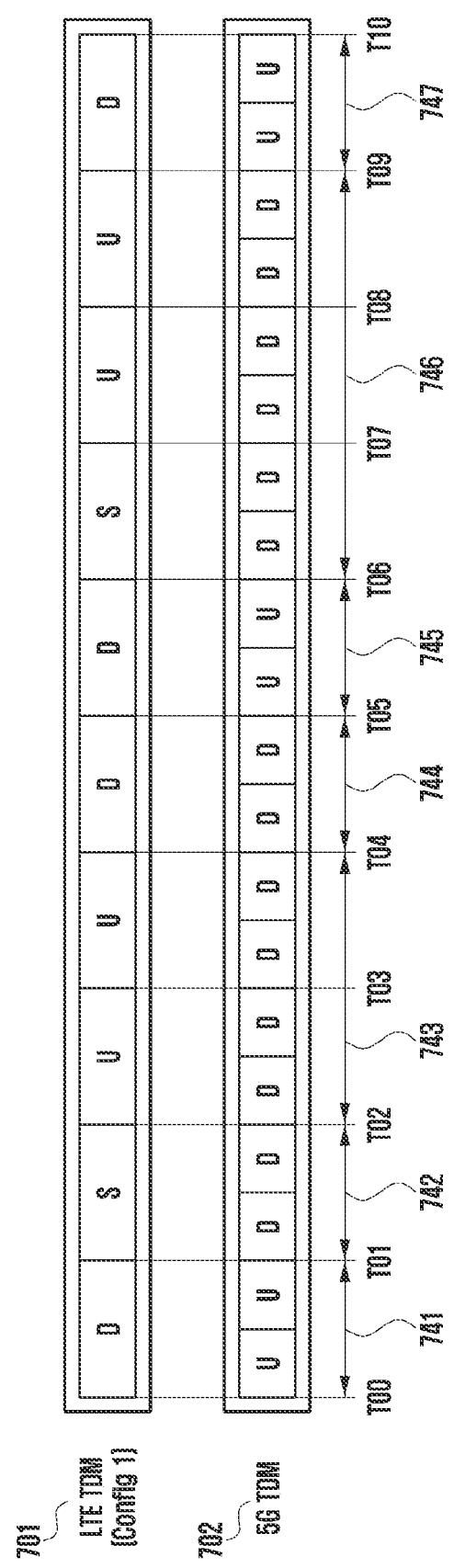
FIG. 7B illustrates a TDM configuration of an uplink and a downlink in a 5G network according to various embodiments.

FIG. 7B illustrates a TDM configuration of an uplink and a downlink in a 5G network when an LTE network uses a TDD uplink and downlink configuration according to various embodiments.

Before a description is made with reference to FIG. 7B, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, FIG. 7B illustrates, as an example of the MR-DC environment, an E-UTRA NR dual connectivity (EN-DC) environment in which the first network is an LTE network and the second network is an NR network. However, a person skilled in the art may identically apply the operation in the EN-DC environment to the MR-DC environment.

Referring to FIG. 7B, an LTE base station (e.g. the first base station 311 in FIG. 3D) and an electronic device (e.g. the second electronic device 302 in FIG. 3D) may configure uplink-downlink configuration #1 as in reference sign 701. Thus, the order of subframes from a $0^{th}$ subframe to a $9^{th}$ subframe may be "D, S, U, U, D, D, S, U, U, and D".

According to one embodiment, the uplink and downlink configuration is configured like uplink-downlink configuration #1 (701) between the LTE base station 311 and the second electronic device 302, and thus a 5G network base station (e.g. the second base station 321 in FIG. 3D) may configure the uplink and downlink configuration in a 5G time division multiplexing (5G TDM) scheme 702. According to one embodiment, in uplink-downlink configuration #1 (701) configured between the first base station 311 and the second electronic device 302, a time interval 741 from time point T00 to time point T01 is one downlink (D) subframe, and thus, the second base station 321 may configure the time interval 741 from time point T00 to time point T01 by two uplink (U) subframes. According to another embodiment, the second base station 321 may allocate one or three or more uplink (U) subframes to the second electronic device 302 at the time interval 741 from time point T00 to time point T01.

According to one embodiment, in uplink-downlink configuration #1 (701) configured between the first base station 311 and the second electronic device 302, a time interval 742 from time point T01 to time point T02 is one special (S) subframe, and thus the second base station 321 may configure two downlink (D) subframes to the second electronic device 302 from time point T01 to time point T02 (742). According to another embodiment, the second base station 321 may configure one or three or more downlink (D) subframes to the second electronic device 302 from time point T01 to time point T02 (742).

According to one embodiment, since two uplink (U) subframes have been allocated to the second electronic device 302 from time point T02 to time point T04 (743) in uplink-downlink configuration #1 (701) configured between the first base station 311 and the second electronic device 302, the second base station 321 may configure four downlink (D) subframes 743 with the second electronic device 302 from time point T02 to time point T04 (743). According to another embodiment, the second base station 321 may configure one or more uplink (U) subframes for each subframe or all of two subframes of the first base station 311 from time point T02 to time point T04 (743)

According to one embodiment, since one downlink (D) subframe is allocated to the second electronic device 302 from time point T04 to time point T05 (744) in uplink-downlink configuration #1 (710) configured between the first base station 311 and the second electronic device 302, the second base station 321 may configure one or more uplink (U) subframes with the second electronic device 302 from time point T04 to time point T05 (744). However, FIG. 7B illustrates an example in which the second base station 321 has allocated two downlink (D) subframes to the second electronic device 302 from time point T04 to time point T05 (744). As described above, the second base station 321 may allocate one or more downlink (D) subframes to the second electronic device 302 with respect to subframes for which one or more uplink (U) subframes can be configured.

According to various embodiments, the case in which the second base station 321 allocates a downlink (D) subframe to subframes for which an uplink (U) subframe can be configured may include the following cases.

The first case may be the case in which the second base station 321 according to one embodiment receives, from the second electronic device 302, a report indicating that there is no data to be transmitted through an uplink (e.g. the case in which an uplink is empty).

The second case may be the case in which the second base station 321 according to one embodiment allows the second electronic device 302 to perform delayed transmission of data necessary for uplink transmission in view of data transmission characteristics, and there is a very small amount of data necessary for uplink transmission.

The third case may be the case in which there is a large amount of data which the second base station 321 according to one embodiment is to transmit to the second electronic device 302 through a downlink. In this case, the second base station 321 may allocate a downlink (D) to subframes for which an uplink (U) can be configured.

According to various embodiments, in uplink-downlink configuration #1 (701) configured between the first base station 311 and the second electronic device 302, one downlink (D) subframe is allocated to the second electronic device 302 from time point T05 to time point T06 (745), and thus the second base station 321 may configure one or more uplink (U) subframes with the second electronic device 302 from time point T05 to time point T06 (745).

According to various embodiments, in uplink-downlink configuration #1 (810) configured between the first base station 311 and the second electronic device 302, one special (S) subframe and two downlink (D) subframes are allocated to the second electronic device 302 from time point T06 to time point T08 (746), and thus the second base station 321 may configure one or more downlink (D) subframes with the second electronic device 302 from time point T06 to time point T09 (746).

According to various embodiments, in uplink-downlink configuration #1 (701) configured between the first base station 311 and the second electronic device 302, one downlink (D) subframe is allocated to the second electronic device 302 from time point T09 to time point T10 (747), and thus the second base station 321 may configure one or more downlink (D) subframes with the second electronic device 302 from time point T09 to time point T10 (747)

According to various embodiments, when the first base station 311 communicates with the third electronic device 303 and/or the fourth electronic device 304 in the TDD scheme based on the scheme described above, similarly, subframes may also be allocated between the third base station 331 and the third electronic device 303 and between the fourth base station 341 and the fourth electronic device 304 according to the scheme of FIG. 7B.

According to various embodiments, since the uplink transmission to the first base station 311 and the uplink transmission to the second base station 321 have time orthogonality, the second electronic device 302 may use all of the maximum transmission power, which can be allocated by the second electronic device 302, for one base station. According to one embodiment, a first communication processor (e.g. the first communication processor 212 in FIG. 6) of the second electronic device 302 may use all of the maximum transmission power, which can be allocated by the second electronic device 302, in time intervals of T02-T04 and T07-T09 in which uplink data and/or control signal transmission to the first base station 311 is performed. According to another embodiment, a second communication processor (e.g. the second communication processor 214 in FIG. 6) may use all of the maximum transmission power, which can be allocated by the second electronic device 302, in time intervals 741, 745, and 747 in which uplink data and/or control signal transmission to the second base station 321 is performed.

Figure 7C:
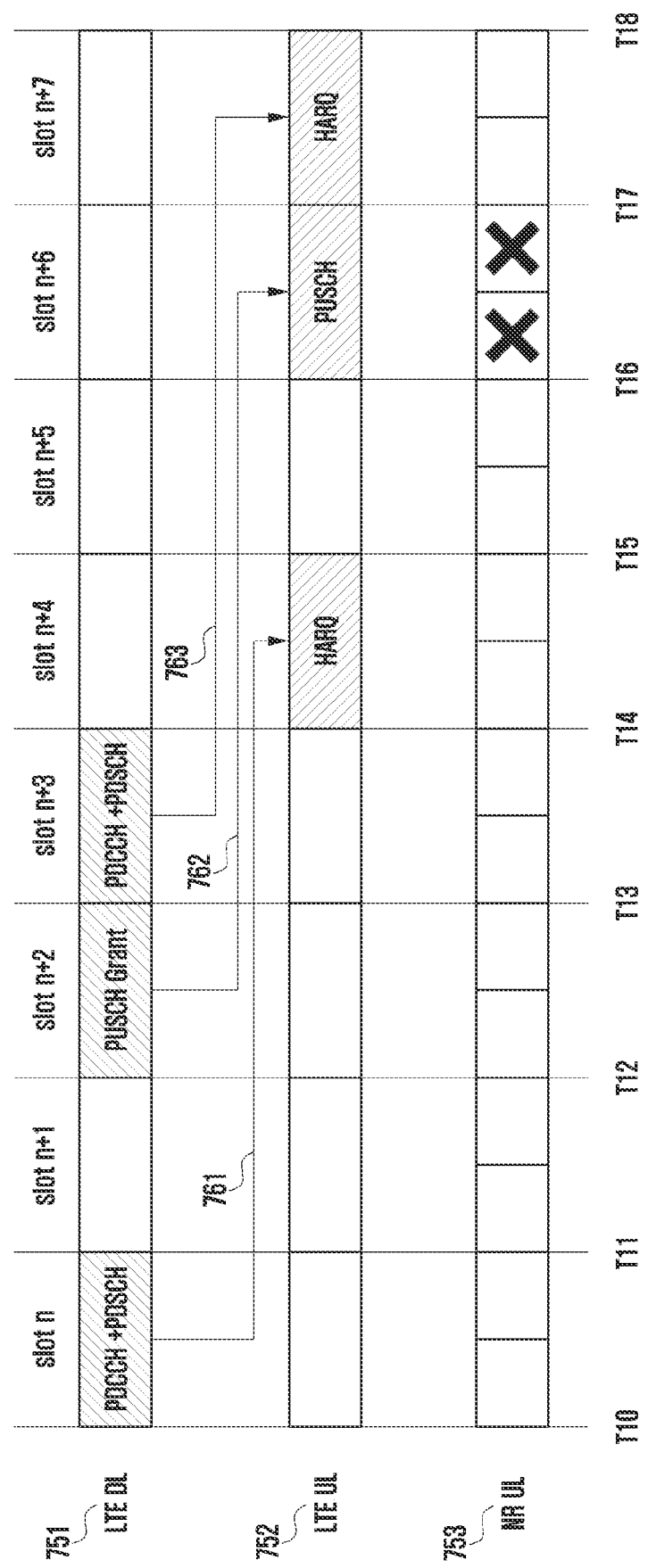
FIG. 7C illustrates an example for describing uplink transmission according to a downlink of an LTE network and an uplink operation in a 5G network according to various embodiments.

FIG. 7C illustrates an example for describing uplink transmission according to a downlink of an LTE network and an uplink operation in a 5G network according to various embodiments.

Before a description is made with reference to FIG. 7C, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, FIG. 7C illustrates, as an example of the MR-DC environment, an E-UTRA NR dual connectivity (EN-DC) environment in which the first network is an LTE network and the second network is an NR network. However, a person skilled in the art may identically apply the operation in the EN-DC environment to the MR-DC environment.

According to the LTE standard specification, an electronic device (e.g. the second electronic device 302 in FIG. 3D) may recognize whether there is transmission in an LTE network through control information received before four slots, for example, through whether a physical uplink shared channel (PUSCH) grant or a physical downlink shared channel (PDSCH) is received. This will be described with reference to FIG. 7C.

Referring to FIG. 7C, in abase station (the first base station 311 in FIG. 3D) which is an LTE network, time point T10 to time point T11 may be one slot of a downlink (DL). Therefore, each of T11-T12, T12-T13, T13-T14, T14-T15, T15-T16, T16-T17, and T17-T18 may be one slot of the downlink. In the first base station 311 which is an LTE network, the unit of one slot may be 1 ms. When a slot of T10-T11 is an nth slot, a slot of T11-T12 may be an (n+1)th slot, a slot of T12-T13 may be an (n+2)th slot, a slot of T13-T14 may be an (n+3)th slot, a slot of T14-T15 may be an (n+4)th slot, a slot of T15-T16 may be an (n+5)th slot, a slot of T16-T17 may be an (n+6)th slot, and a slot of T17-T18 may be an (n+7)th slot.

According to one embodiment, the first base station 311, which is an LTE base station, may transmit a physical downlink shared channel (PDSCH) in addition to a physical data control channel (PDCCH) to the second electronic device 302 through a downlink 751 in the nth slot. In this case, the second electronic device 302 may transmit an HARQ response signal through an uplink 752 in the (n+4)th slot which is four slots later than the nth slot. In FIG. 7C, reference sign 761 is a line for describing a relationship in which a response signal is transmitted through the uplink 752 four slots later when the first base station 311 transmits a control information and/or data through the downlink 751.

According to one embodiment, the second electronic device 302 may transmit a message, which requests resource allocation for uplink transmission, through the uplink 752 in a slot before the (n+1)th slot. In response thereto, the first base station 311 may transmit a physical uplink shared channel (PUSCH) grant in the (n+2)th slot. When the PUSCH grant is received through the downlink 751 in the (n+2)th slot, the second electronic device 302 may transmit a PUSCH through the uplink 752 in the (n+6)th slot which is four slots later than the (n+2) the slot. In FIG. 7C, reference sign 762 is a line for describing a relationship in which the PUSCH is transmitted through the uplink 752 four slots later when the first base station 311 transmits the PUSCH grant through downlink 751.

According to one embodiment, the first base station 311, which is an LTE base station, may transmit a physical downlink shared channel (PDSCH) in addition to a physical data control channel (PDCCH) to the second electronic device 302 through the downlink 751 in the (n+3)th slot. In this case, the second electronic device 302 may transmit an HARQ response signal through the uplink 752 of the (n+7)th slot which is four slots later than the (n+3)th slot. In FIG. 7C, reference sign 763 is a line for describing a relationship in which a response signal is transmitted through the uplink 752 four slots later when the first base station 311 transmits a control information and/or data through the downlink 751.

According to various embodiments, the second electronic device 302 in the EN-DC environment may transmit/receive data and/or a control signal to/from a 5G base station (e.g. the second base station 321 in FIG. 3D). According to one embodiment, the second electronic device 302 may transmit data and/or a control signal to the second base station 321 through an uplink 753. In this case, when the second electronic device 302 uses an FDD scheme and a dynamic power allocation method, the second electronic device 302 may adjust uplink 753 transmission power to the second base station 321 according to reverse transmission to the first base station 311.

According to one embodiment, the second electronic device 302 is required to determine the downlink 751 from the first base station 311 for each slot (1 ms), and then determine whether uplink transmission is required four slots later. Therefore, the second electronic device 302 is required to: calculate transmission power to be transmitted to the first base station 311 when transmitting a control signal and/or data through an uplink; and determine power, which can be transmitted to the second base station 321, when transmitting a control signal and/or data to the second base station 321, which is a 5G base station, through an uplink at the same time, and configure uplink transmission power based thereon.

According to one embodiment, in the second electronic device 302, there may be no data and/or a control signal to be transmitted to the first base station 311 from time point T10 to time point T14. In this case, the second electronic device 302 may transmit data and/or a control signal to the second base station 321 through the uplink 753 from time point T10 to time point T14. Further, the second electronic device 302 has no data and/or control signal to be transmitted to the first base station 311 from time point T10 to time point T14, and thus the second electronic device 302 can allocate even the maximum transmission power when transmitting data and/or a control signal to the second base station 321 through the uplink 753.

According to another embodiment, the second electronic device 302 may have data and/or a control signal to be transmitted to the first base station 311 from T14 to T15 and from T16 to T18.

In this case, from T14 to T15 and from T16 to T18, the second electronic device 302 may allocate power to data and/or a control signal transmitted through the uplink 752 of the first base station 311 within a maximum transmission power range, and may transmit data and/or a control signal to the second base station 321 through the uplink 753 by using surplus power other than the allocated power. In this case, when the maximum transmission power has been allocated to the data and/or the control signal transmitted through the uplink 752 of the first base station 311, the second electronic device 302 may stop the uplink 753 transmission to the second base station 321. Stopping the uplink 753 transmission to the second base station 321 is illustrated as in reference signs 771 and 772.

Figure 8A:
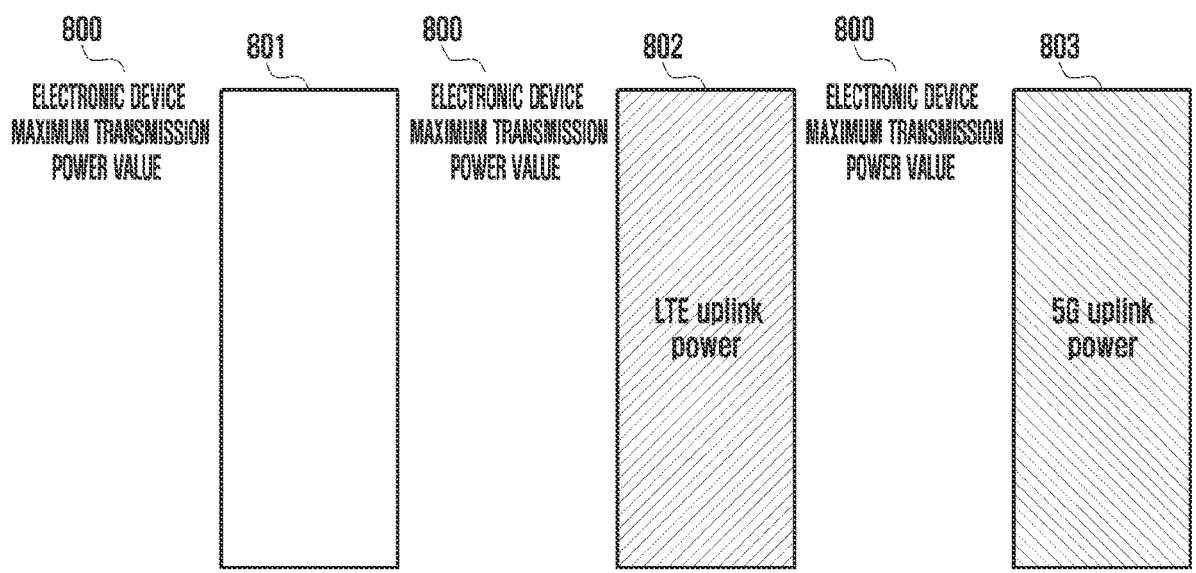
FIG. 8A is a view for describing uplink power allocation by a second electronic device (e.g. a second electronic device 302 in FIG. 3D).

FIG. 8A is a view for describing uplink power allocation when a second electronic device (e.g. the second electronic device 302 in FIG. 3D) performs communication with a first base station (e.g. the first base station 311 in FIG. 3D) and a second base station (e.g. the second base station 321 in FIG. 3D) in a TDD scheme according to various embodiments.

Before a description is made with reference to FIG. 8A, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, FIG. 8A illustrates, as an example of the MR-DC environment, an E-UTRA NR dual connectivity (EN-DC) environment in which the first network is an LTE network and the second network is an NR network. However, a person skilled in the art may identically apply the operation in the EN-DC environment to the MR-DC environment.

Referring to FIG. 8A, in the second electronic device 302, a maximum uplink power value (or a maximum power threshold value) 800, configured at the time of manufacturing a product, may be configured as a specific value. The second electronic device 302 may maintain the state in which the second electronic device 302 is simultaneously connected to both the first base station 311 and the second base station 321 in an EN-DC environment. When the second electronic device 302 is simultaneously connected to both the first base station 311 and the second base station 321 in the EN-DC environment but uplink transmission is not performed, the second electronic device 302 may be in a state in which the second electronic device 302 never uses uplink transmission power, as shown by reference sign 801. In the above-described state in which the second electronic device 302 is simultaneously connected to both the first base station 311 and the second base station 321 in the EN-DC environment, data and/or a control signal may be transmitted through an uplink in a TDD scheme. According to one embodiment, as described in FIG. 7B, when the first base station 311 configures uplink and downlink transmission in a TDD scheme, the second base station 321 may also configure uplink and downlink transmission in the TDD scheme.

With reference to FIG. 7B, a description will be made of power allocation when the second electronic device 302 in FIG. 8A transmits data and/or a control signal through the uplink. According to one embodiment, in relation to the second electronic device 302, in the time interval 741, downlink transmission from the first base station 311 may be performed, and uplink transmission to the second base station 321 may be performed. In this case, since the second electronic device 302 performs uplink transmission to only the second base station 321, the second electronic device 302 may allocate all of maximum transmission power to the uplink of the second base station 321, as shown by reference sign 803. As described above, time intervals, in which the second electronic device 302 performs uplink transmission to only the second base station 321, correspond to the time interval 745 and the time interval 747. Thus, in the time intervals 745 and 747, the second electronic device 302 may allocate all of the maximum transmission power to the uplink of the second base station 321, as shown by reference sign 803.

According to one embodiment, in relation to the second electronic device 302, uplink transmission to the first base station 311 may be performed in the time interval 743, and downlink transmission from the second base station 321 may be performed in the time interval 743. In this case, in the time interval 743, since uplink transmission is performed to only the first base station 311, the second electronic device 302 may allocate all of maximum transmission power to the uplink of the first base station 311, as shown by reference sign 802. As described above, a time interval, in which the second electronic device 302 performs uplink transmission to only the first base station 311, is from time point T07 to time point T09 in the time interval 746. Thus, from time point T07 to time point T09, the second electronic device 302 may allocate all of the maximum transmission power to the uplink of the first base station 311, as shown by reference sign 803.

According to various embodiments, when the first base station 311 uses a TDD scheme, the second base station 321, a third base station (e.g. the third base station 331 in FIG. 3D), a fourth base station (e.g. the fourth base station 341 in FIG. 3D), and a fifth base station (e.g. the fifth base station 351 in FIG. 3D), which are 5G base stations, may perform uplink and downlink transmission in the TDD scheme, based on the method illustrated in FIG. 6. At this time, the method illustrated in FIG. 8A may be used for power allocation.

Figure 8B:
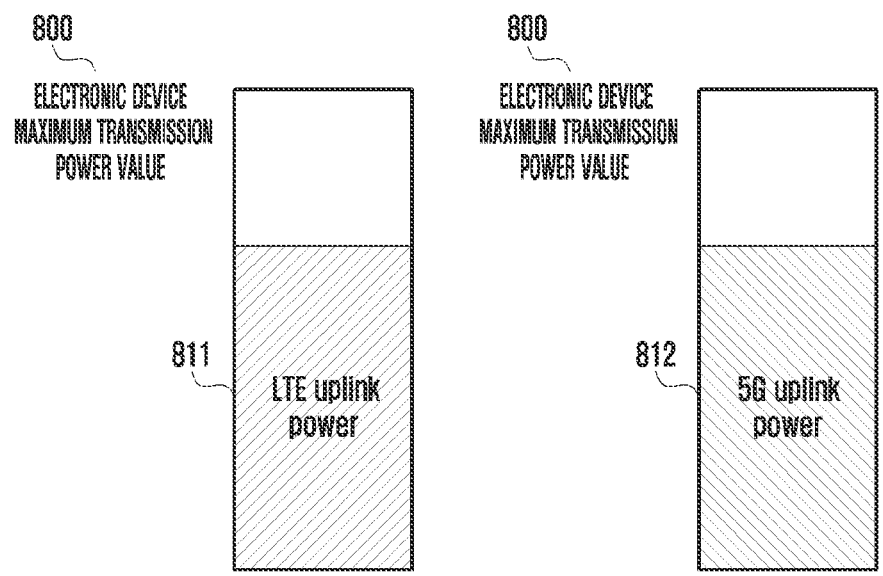
FIG. 8B is a view for describing a method for allocating power to an uplink by a second electronic device (e.g. the second electronic device 302 in FIG. 3D) based on an FDD scheme according to various embodiments.

FIG. 8B is a view for describing a method in which a second electronic device (e.g. the second electronic device 302 in FIG. 3D) allocates, based on an FDD scheme, power to an uplink in a first base station (e.g. the first base station 311 in FIG. 3D) and a second base station (e.g. the second base station 321 in FIG. 3D) according to various embodiments.

Referring to FIG. 8B, in the second electronic device 302, a maximum uplink power value 800, configured at the time of manufacturing a product, may be configured as a specific value. The second electronic device 302 may maintain the state in which the second electronic device 302 is simultaneously connected to both the first base station 311 and the second base station 321 in an EN-DC environment. When the second electronic device 302 is simultaneously connected to both the first base station 311 and the second base station 321 in the EN-DC environment but uplink transmission is not performed, the second electronic device 302 may be in a state in which the second electronic device 302 never uses uplink transmission power, as shown by reference sign 801 in FIG. 8A.

According to various embodiments, in the state in which the second electronic device 302 is simultaneously connected to both the first base station 311 and the second base station 321 in the EN-DC environment, data and/or a control signal may be transmitted through an uplink in an FDD scheme. According to one embodiment, even when the second electronic device 302 transmit data and/or a control signal through the uplink in the FDD scheme in the EN-DC environment, the second electronic device 302 may transmit, as in the TDD scheme, the data and/or control signal at a time at which uplink transmission to the first base station 311 does not overlap uplink transmission to the second base station 321. According to another embodiment, in the state in which the second electronic device 302 is simultaneously connected to both the first base station 311 and the second base station 321 in the EN-DC environment, when the second electronic device 302 transmits data and/or a control signal through an uplink in the FDD scheme, uplink transmission to the first base station 311 and the uplink transmission to the second base station 321 may be performed at the same (overlapping) time.

Referring to FIG. 8B, when the second electronic device 302 transmits data and/or a control signal through an uplink in an FDD scheme in the EN-DC environment, the second electronic device 302 may determine a transmission power required by each transmission, as in FIG. 8B, if each transmission is not performed at an overlapping time.

According to one embodiment, when the first communication processor (e.g. the first communication processor 212 in FIG. 6) of the second electronic device 302 transmits data and/or a control signal through an uplink of the first base station 311 which is an LTE base station, the first communication processor may determine transmission power as a power value 811 requested from the first base station 311 and may transmit the data and/or the control signal through the uplink.

According to one embodiment, when the second communication processor (e.g. the second communication processor 214 in FIG. 6) of the second electronic device 302 transmits data and/or a control signal through an uplink of the second base station 321 which is a 5G base station, the second communication processor may determine transmission power as a power value 812 requested from the second base station 321 and may transmit the data and/or the control signal through the uplink. As described above, when the uplink transmission to the first base station 311 does not overlap the uplink transmission to the contact area 312, the second electronic device 302 may freely configure and transmit power within the maximum transmission power value 800.

According to various embodiments, when the second electronic device 302 is requested to transmit data and/or a control signal to both the first base station 311 and the second base station 321 through uplink at the same time, requested transmission power may exceed the maximum transmission power. According to one embodiment, when the maximum transmission power, which can be transmitted by the second electronic device 302, is 23 dBm, the maximum transmission power configured in the first base station 311 is 16 dBm, and the maximum transmission power configured in the second base station 321 is 14 dBm, the sum of the transmission power requested by the first base station 311 and the transmission power requested by the second base station 321 may exceed the maximum transmission power which can be transmitted by the second electronic device 302. In this case, there may be a need for adjustment of transmission power allocation in the second electronic device 302.

Figure 9:
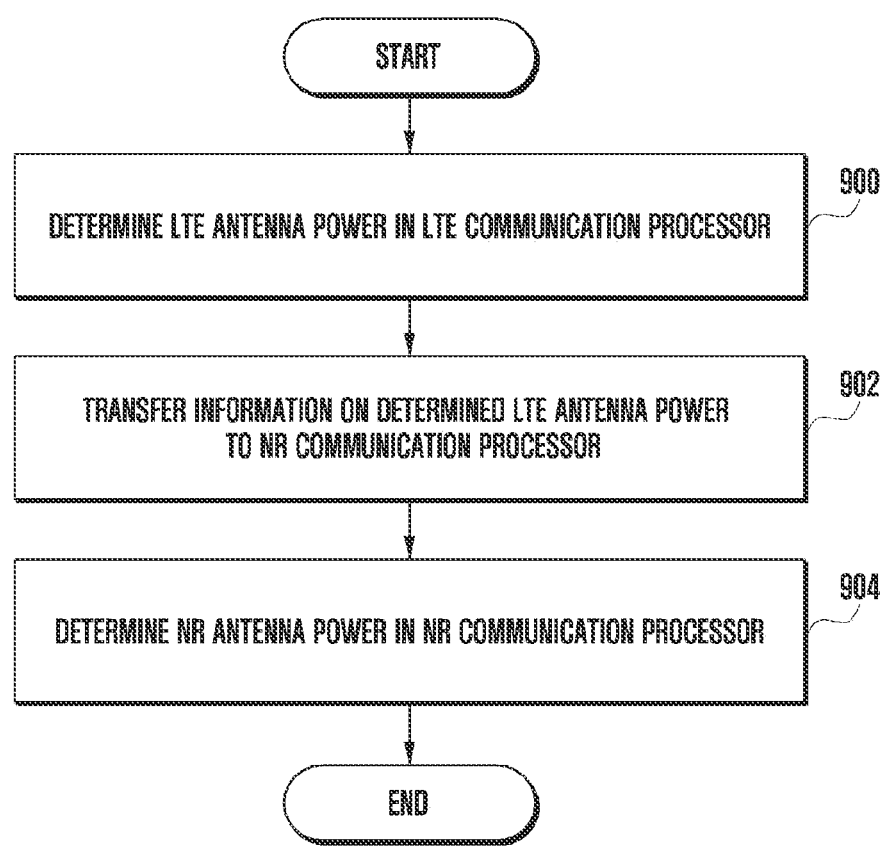
FIG. 9 is a flowchart illustrating control when an electronic device (e.g. the electronic device 101 in FIG. 6) uses a dynamic power allocation method for an uplink in an MR-DC environment according to various embodiments.

FIG. 9 is a flowchart illustrating control when an electronic device (e.g. the electronic device 101 in FIG. 6) allocates power to an uplink in an EN-DC environment according to various embodiments.

Before a description is made with reference to FIG. 9, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, FIG. 8A illustrates, as an example of the MR-DC environment, an E-UTRA NR dual connectivity (EN-DC) environment in which the first network is an LTE network and the second network is an NR network. However, a person skilled in the art may identically apply the operation in the EN-DC environment to the MR-DC environment.

In the operations in FIG. 9, the electronic device 101 may stay connected to an LTE base station (e.g. the first base station 311 in FIG. 3D) in an EN-DC environment, and may stay connected to an NR base station (e.g. the second base station 321 in FIG. 3D). Referring to FIG. 9, an LTE communication processor (e.g. the first communication processor 212 in FIG. 6) of the electronic device 101 may determine uplink power for an LTE communication network in operation 900. According to one embodiment, the uplink power determined by the first communication processor 212 may be an LTE antenna power. According to one embodiment, when the first communication processor 212 determines an LTE antenna power, the first communication processor 212 may configure the LTE antenna power based on requested transmission power information received from the first base station 311.

According to various embodiments, after the LTE antenna power is determined, the first communication processor 212 may transfer, in operation 902, information on the determined LTE antenna power to the second communication processor 214. According to one embodiment, in operation 902, when transferring the information on the determined LTE antenna power, the first communication processor 212 may transmit margin information together with the information on the determined LTE antenna power. According to another embodiment, in operation 902, the first communication processor 212 may transfer information obtained by subtracting the determined LTE antenna power value from the maximum transmission power which the electronic device 101 can allocate to the uplink (UL). According to another embodiment, in operation 902, the first communication processor 212 may transfer information obtained by subtracting the determined LTE antenna power value and the margin value from the maximum transmission power which the electronic device 101 can allocate to the uplink (UL).

According to various embodiments, in operation 904, the second communication processor 214 may receive the LTE antenna power information from the first communication processor 212. In response thereto, the second communication processor 214 may determine NR antenna power available for uplink (UL) transmission in an NR network. According to one embodiment, when receiving the LTE antenna power information from the first communication processor 212, the second communication processor 214 may determine the NR antenna power within a range of a value obtained by subtracting the determined LTE antenna power value from the maximum transmission power which the electronic device 101 can allocate to the uplink (UL). According to another embodiment, when receiving the LTE antenna power information and the margin information from the first communication processor 212, the second communication processor 214 may determine the NR antenna power within a range of a value obtained by subtracting the determined LTE antenna power and the margin value from the maximum transmission power which the electronic device 101 can allocate to the uplink (UL). According to another embodiment, the second communication processor 214 may receive information on maximum NR antenna power, available for the uplink (UL) transmission in the NR network, from the first communication processor 212. In this case, the second communication processor 214 may determine the NR antenna power within the maximum NR antenna power information received from the first communication processor 212.

Figure 10:
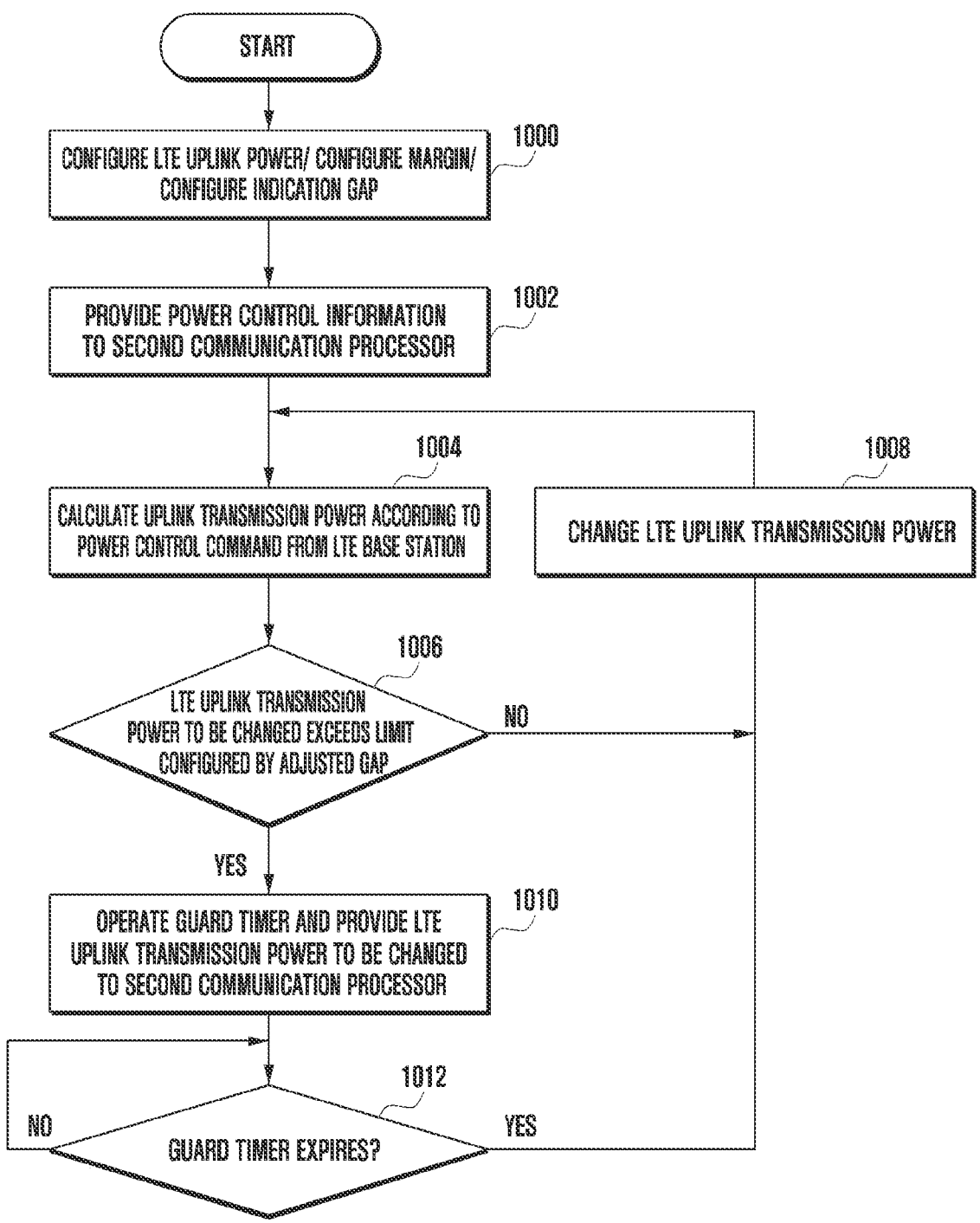
FIG. 10 is a flowchart illustrating control when an electronic device (e.g. the electronic device 101 in FIG. 6) uses a dynamic power allocation method for an uplink in an MR-DC environment according to various embodiments.

FIG. 10 is a flowchart illustrating control when an electronic device (e.g. the electronic device 101 in FIG. 6) uses a dynamic power allocation method for an uplink in an MR-DC environment according to various embodiments.

Before a description is made with reference to FIG. 10, in the disclosure, an operation of an electronic device in a multi-RAT dual connectivity (MR-DC) environment, in which a first network and a second network using different wireless communication technologies coexist, will be described. A base station in the first network may be a master node (MN), and a base station in the second network may be a secondary node (SN). According to one embodiment, FIG. 10 illustrates, as an example of the MR-DC environment, an E-UTRA NR dual connectivity (EN-DC) environment in which the first network is an LTE network and the second network is an NR network. However, a person skilled in the art may identically apply the operation in the EN-DC environment to the MR-DC environment.

Referring to FIG. 10, in operation 1000, a first communication processor (e.g. the first communication processor 212 in FIG. 6) may receive a maximum transmission power value for an uplink resource, based on information received from a first base station (e.g. the first base station 311 in FIG. 3D). According to various embodiments, the first communication processor 212 may receive various parameters from information which the first base station 311 has transmitted through RRC signaling when the first communication processor 212 has made an initial connection to the first base station 311. According to one embodiment, the first communication processor 212 may configure maximum transmission power to be transmitted to the first base station 311 by using parameters, which can configure power, among the various parameters. According to various embodiments, in operation 1000, the first communication processor 212 may identify the maximum transmission power value for an uplink resource, which is to be transmitted to the first base station 311, may configure required margin power, and may configure an indication gap. According to one embodiment, the first communication processor 212 may differently configure the required margin power depending on the maximum transmission power value for an uplink resource from the first base station 311. According to another embodiment, the first communication processor 212 may configure the required margin power as a specific value regardless of the maximum transmission power value of an uplink resource, which is to be transmitted to the first base station 311.

According to various embodiments, the indication gap configured by the first communication processor 212 may be a power value for adjusting how frequently power control information is provided to a second communication processor (e.g. the second communication processor 214 in FIG. 6). According to various embodiments, a value of the indication gap may be greatly adjusted when the power control information is frequently provided to the second communication processor 214. According to one embodiment, the value of the indication gap may be greatly adjusted when a change in a transmission power value for a resource allocated to an uplink from the first base station 311 is great. According to another embodiment, the indication gap may be configured as a fixed value configured based on a power change which has been measured in a simulation or in a site in which the electronic device 101 is actually used.

According to various embodiments, in operation 1002 after completion of operation 1000, the first communication processor 212 may provide the power control information to the second communication processor 214. According to various embodiments, the power control information may include a first transmission power value to be used by the first communication processor 212. According to one embodiment, the first transmission power value may be upper power information to be used by the first communication processor 212. According to one embodiment, the first transmission power value may be differently configured depending on a channel state between the electronic device and the first base station 311. According to another embodiment, the power control information may include the first transmission power value and a margin power value. According to one embodiment, the margin power value may be fixed to a predetermined value. According to another embodiment, the margin power value may be differently configured depending on the channel state between the electronic device 101 and the first base station 311 and/or on the movement speed of the electronic device 101. For example, the first communication processor 212 may configure the margin power value to be a first margin value when the channel state between the electronic device and the first base station 311 significantly changes, and may configure the margin power value to be a second margin value when the channel state between the electronic device and the first base station 311 does not significantly changes. In this case, the first margin value may be configured to be greater than the second margin value. According to another embodiment, the power control information may be configured as a value obtained by subtracting the first transmission power value to be used by the first communication processor 212 from the maximum transmission power (e.g. the reference sign 800 in FIG. 8A) which can be allocated by the electronic device 101. According to another embodiment, the power control information may be configured as a value obtained by subtracting the first transmission power value to be used by the first communication processor 212 and the margin power value from the maximum transmission power (e.g. the reference sign 800 in FIG. 8A) which can be allocated by the electronic device 101. In this case, the power control information, which the first communication processor 212 provides to the second communication processor 214, may be a maximum power value which can be used by the second communication processor 214.

According to various embodiments, in operation 1004, the second communication processor 214 may determine uplink transmission power to be transmitted to an NR base station (e.g. the second base station 321 in FIG. 3D), based on the power control information provided from the first communication processor 212. In this case, the second communication processor 214 may calculate power, which can be used by the second communication processor 214, by using the maximum transmission power, which can be allocated by the electronic device 101, and the power control information received from the first communication processor 212. According to another embodiment, when the maximum power value, which can be used by the second communication processor 214, is received as the power control information from the first communication processor 212, the second communication processor 214 may perform uplink transmission within a range of the power control information.

According to one embodiment, the indication gap may be configured to be a value which is the same as the margin power value. In this case, for example, the first communication processor 212 may receive transmit-power control (TPC) information from the first base station 311 through a downlink control information (DCI). When the first communication processor 212 receives a command for increasing the uplink transmission power in the TPC received from the first base station 311, the first communication processor 212 may operate to increase the uplink transmission power. At this time, if the margin value is the same as the indication gap, the first communication processor 212 may not provide additional power information to the second communication processor 214 when the uplink transmission power is increased within the margin. As described above, the first communication processor 212 is allowed not to provide power information to the second communication processor 214, and thus it is possible to reduce the amount of information transmitted between the first communication processor 212 and the second communication processor 214, and how often the information is transmitted therebetween. According to another embodiment, the indication gap may be configured to be a value smaller than the margin power value.

According to various embodiments, the first communication processor 212 may provide the power control information to the second communication processor 214, and then may receive the TPC information from the first base station 311, which is an LTE base station, through the DCI. The first communication processor 212 may adjust uplink transmission power, based on the received TPC. According to various embodiments, when adjusting uplink transmission power based on the received TPC, the first communication processor 212 may determine, in operation 1006, whether LTE uplink transmission power to be changed exceeds a limit configured by the indication gap. According to one embodiment, when the first communication processor 212 receives the command for increasing uplink transmission power in the TPC received from the first base station 311, the first communication processor 212 may operate to increase the uplink transmission power. At this time, if the indication gap is smaller than the margin value, even when the uplink transmission power is increased within the margin, the first communication processor 212 may additionally determine whether the increased uplink transmission power is within the indication gap. According to one embodiment, if the increased uplink transmission power is within the indication gap (1006—NO), the first communication processor 212 may not provide power information to the second communication processor 214. In response thereto, when the increased uplink transmission power is within the indication gap (1006—NO), the first communication processor 212 may perform operation 1008. In operation 1008, the first communication processor 212 may change, based on the TPC, uplink transmission power to be transmitted to the first base station 311 which is an LTE base station. According to various embodiments, if the increased uplink transmission power exceeds a range of the indication gap (1006→YES), the first communication processor 212 may provide additional power information to the second communication processor 214. For example, in operation 1000, the first communication processor 212 may configure the maximum uplink transmission power to the first base station 311 to be 18 dB. In operation 1000, the first communication processor 212 may configure the margin power to be 2 dB, and may configure the indication gap to be 1 dB. In this case, when the uplink transmission power to be transmitted to the first base station 311 based on the TCP exceeds 1 dB, the first communication processor 212 moves to operation 1010.

According to various embodiments, in operation 1010, the first communication processor 212 may operate a guard timer and may transmit LTE uplink transmission power to be changed to the second communication processor 214. According to one embodiment, the first communication processor 212 may transmit only new LTE uplink power information to the second communication processor 214. According to another embodiment, the first communication processor 212 may transmit new LTE power information and a new margin power value to the second communication processor 214. According to another embodiment, the first communication processor 212 may transmit new LTE uplink power information, a new margin power value, and a new indication gap to the second communication processor 214.

According to one embodiment, after performing operation 1010, the first communication processor 212 may determine, in operation 1012, whether the operated guard timer expires. When the guard timer is determined not to have expired in operation 1012 (1012→NO), the first communication processor 212 may stand by until the guard timer expires. According to one embodiment, when the guard timer is determined to have expired in operation 1012 (1012→YES), the first communication processor 212 may change the LTE uplink transmission power in operation 1008.

Figure 11A:
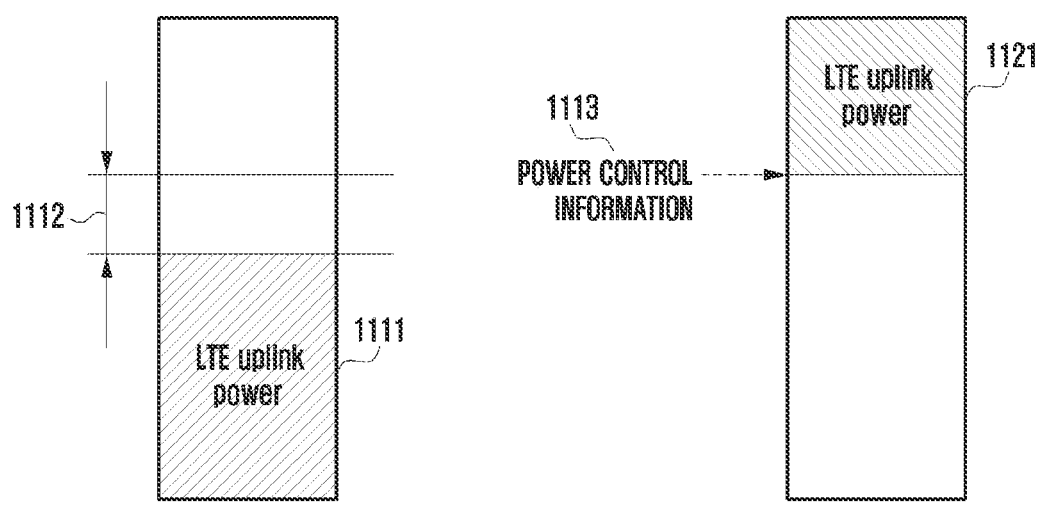
FIG. 11A illustrates an example for describing a dynamic power allocation method according to various embodiments.

FIG. 11A illustrates an example for describing a dynamic power allocation method according to various embodiments.

Referring to FIG. 11A, the first communication processor 212 may receive an uplink transmission power value from a first base station (e.g. the first base station 311 in FIG. 3D). On the basis thereof, the first communication processor 212 may determine an uplink transmission power 1111 to be transmitted to the first base station 311. According to various embodiments, the first communication processor 212 may generate power control information 1113 by including a margin power value in the uplink transmission power to be transmitted to the first base station 311. According to one embodiment, the first communication processor 212 may provide the power control information to the second communication processor 214.

Figure 11B:
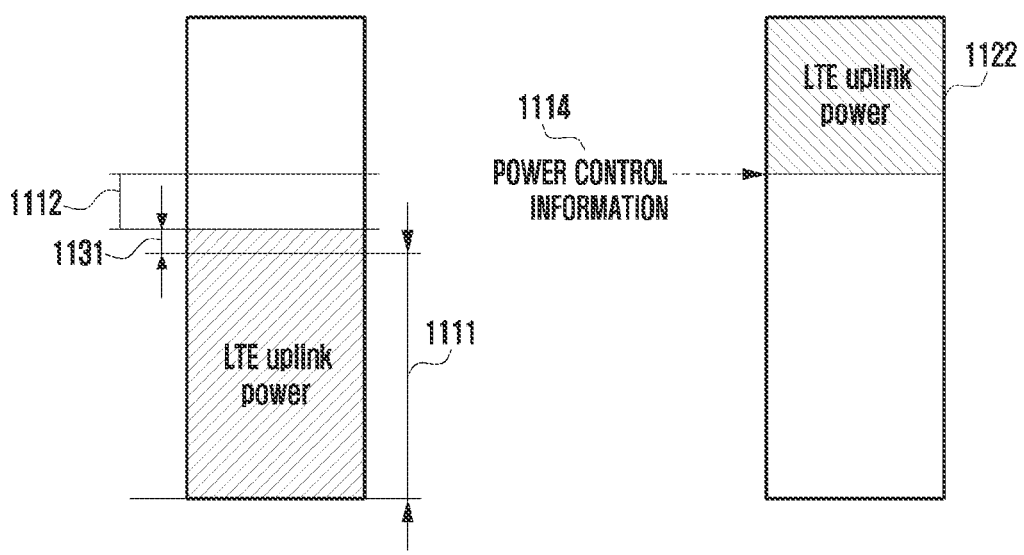
FIG. 11B illustrates an example for describing a dynamic power allocation method according to various embodiments.

FIG. 11B illustrates an example for describing a dynamic power allocation method according to various embodiments.

According to various embodiments, the first communication processor 212 may change uplink transmission power according to a power control command from a first base station (e.g. the first base station 311 in FIG. 3D). As illustrated in FIG. 11B, the first communication processor 212 may change the uplink transmission power according to a power control command such that the uplink transmission power increases from the uplink transmission power 1111 to be transmitted to the first base station 311 at a previous time point. According to various embodiments, a changed uplink transmission power (1131) to be transmitted to the first base station 311 may be a value based on the power control command. According to one embodiment, the first communication processor 212 may add margin power 1112 in addition to the changed transmission power value. According to one embodiment, the first communication processor 212 may generate, as power control information 1114, a value obtained by adding the changed transmission power value and the margin power 1112, and the power control information 1114 to the second communication processor 214. The second communication processor 214 may determine uplink transmission power to be transmitted to the second base station 321, based on the changed power control information 1114.

The embodiments of the disclosure described and shown in the specification and the drawings have been presented to easily explain the technical contents of the embodiments of the disclosure and help understanding of the embodiments of the disclosure, and are not intended to limit the scope of the embodiments of the disclosure. Therefore, the scope of various embodiments of the disclosure should be construed to include, in addition to the embodiments disclosed herein, all changes and modifications derived on the basis of the technical idea of the disclosure.

The disclosure may be applicable to controlling transmission power of an electronic device in a wireless communication system.

The invention claimed is:

1. A mobile communication apparatus comprising:
a display;
a memory; and
at least one processor including a first processing portion for communicating with a first node of a first cellular network and a second processing portion for communicating with a second node of a second cellular network,
wherein the first processing portion is configured to:
establish a first radio connection with the first node,
receive, from the first node through the first radio connection, a first uplink maximum power value associated with the first radio connection and a second uplink maximum power value associated with a second radio connection corresponding to the second node,
transmit, to the first node, a first signal using a first power value below the first uplink maximum power value, and
provide, to the second processing portion, first information corresponding to the first power value and second information related to the second uplink maximum power value, and
wherein the second processing portion is configured to:
acquire the first information and the second information from the first processing portion, and
determine a second power value below the second uplink maximum power value to transmit a second signal to the second node through the second radio connection, while maintaining the first radio connection, based on at least one of the first information and the second information.

2. The apparatus of claim 1, wherein the second processing portion is further configured not to transmit the second signal based on the first information.

3. The apparatus of claim 2, wherein the first processing portion is further configured to:

transmit, to the first node, a third signal through the first radio connection using a third power value that is below the first uplink maximum power value and has a value different from the first power value, and provide, to the second processing portion, third information corresponding to the third power value; and wherein the second processing portion is further configured to:

acquire the third information from the first processing portion, determine a fourth power value that is below the second uplink maximum power value and has a value different from the second power value based on the third information, and transmit a fourth signal to the second node through the second radio connection using the fourth power value.

4. The apparatus of claim 2, wherein the first processing portion is further configured to:

receive, from the first node, time division duplexing (TDD) configuration information related to the first radio connection; and determine the transmission timing of the first signal based on the TDD configuration information.

5. The apparatus of claim 1, wherein the second processing portion is further configured to:

receive, from the second node, a command indicating a change in the second power value of the second signal after transmitting the second signal; and not to change the second power value based on the first information when the command is received.

6. The apparatus of claim 1, wherein the first processing portion is further configured to transmit, to the first node, a parameter indicating whether the mobile communication apparatus supports a function where the first power value and the second power value dependently change with regard to the establishment of the first radio connection.

7. The apparatus of claim 6, wherein the parameter further includes a dynamic power sharing parameter.

8. The apparatus of claim 1, wherein the second processing portion is further configured to:

determine a fourth power value lower than the second uplink maximum power value based on a transmission timing of the first signal in the first cellular network scheduled by the first node and a transmission timing of the second signal in the second cellular network scheduled by the second node; and transmit, to the second node, a fourth signal based on the fourth power value.

9. The apparatus of claim 1, wherein the second uplink maximum power value is one of 14 dBm, 17 dBm, or 23 dBm.

10. The apparatus of claim 1, wherein the first processing portion and the second processing portion are comprised of a single chip.

11. A mobile communication apparatus comprising:

a first processor; and a second processor, wherein the first processor is configured to:

establish a first radio connection with a first node of a first cellular network, receive, from the first node, an uplink maximum power value associated with a second radio connection corresponding to a second node of a second cellular network, transmit, to the second processor, information corresponding to the uplink maximum power value, generate other information based on a second power value of a second signal transmitted to the first node, and transmit, to the second processor, the other information, and wherein the second processor is configured to:

receive the information and the other information from the first processor, and transmit, to the second node, a first signal having a first power value equal to or less than the uplink maximum power value based on the information and the other information, while maintaining the second radio connection.

12. The apparatus of claim 11, wherein the second processor is further configured to:

determine whether to transmit the first signal based on the other information;

determine the first power value of the first signal based on the information and the another information when the first signal transmission is determined; and transmit, to the second node, the first signal with the first power value.

13. The apparatus of claim 12, wherein the second processor is further configured not to transmit the first signal, if the first power value is less than a threshold value.

14. The apparatus of claim 12, wherein the second processor is further configured not to transmit the first signal, if a difference between the uplink maximum power value and the first power value is less than a threshold value.

15. The apparatus of claim 11, wherein the first processor is further configured to transmit, to the first node, a parameter indicating whether the mobile communication apparatus supports a function in which the first power value and the second power value of the second signal can be changed dependently from each other, while maintaining a radio connection with the first node.

16. The apparatus of claim 15, wherein the parameter indicates dynamic power sharing.

17. The apparatus of claim 11, wherein the first processor is further configured to transmit, to the first node, a second signal with a power value based on a first signal transmission timing in the first cellular network scheduled by the first node and a second signal transmission timing in the second cellular network scheduled by the second node.

18. The apparatus of claim 17, wherein the first processor is further configured to:

receive, from the first node, time division duplexing (TDD) configuration information related to the first radio connection while establishing the first radio connection; and determine the first signal transmission timing based on the TDD configuration information.

19. The apparatus of claim 11, wherein the maximum power value is one of 14 dBm, 17 dBm, or 23 dBm.

20. The apparatus of claim 11, further comprising:

a third processor, wherein the third processor is configured to:

receive the information from the first processor, and transmit the information to the second processor.

21. The apparatus of claim 11, wherein the first processor and the second processor are comprised of a single chip or package.

22. The apparatus of claim 11, wherein the first processor and the second processor are communication processors.

23. The apparatus of claim 11, wherein the first cellular network corresponds to a $4^{th}$ generation communication network or a long term evaluation (LTE) communication network, and wherein the second cellular network corresponds a 5<sup>th</sup> generation communication network or new radio (NR) communication network.

24. The apparatus of claim 11,
wherein the first node corresponds to a base station of a 4<sup>th</sup> generation communication network or a long term evaluation (LTE) communication network, and
wherein the second node corresponds a base station of a 5<sup>th</sup> generation communication network or a new radio (NR) communication network.

25. A mobile communication apparatus comprising:
at least one processor including a first processing portion for communicating with a first node of a first cellular network and a second processing portion for communicating with a second node of a second cellular network,
wherein the first processing portion is configured to:
establish a first radio connection with the first node of the first cellular network,
receive, from the first node, an uplink maximum power value associated with a second radio connection corresponding to the second node of the second cellular network,
transmit, to the second processing portion, information corresponding to the uplink maximum power value,
generate other information based on a second power value of a second signal transmitted to the first node, and
transmit, to the second processing portion, the other information, and wherein the second processing portion is configured to:
receive the information and the other information from the first processing portion, and
transmit, to the second node, a first signal having a first power value equal to or less than the uplink maximum power value based on the information and the other information, while maintaining the first radio connection.

26. The apparatus of claim 25, wherein the second processing portion is further configured to determine whether to transmit the first signal based on the other information.

27. The apparatus of claim 25 wherein the first processing portion is further configured to transmit, to the first node, a parameter indicating whether the mobile communication apparatus supports a function in which the first power value and the second power value of the second signal can be changed dependently from each other, while maintaining a radio connection with the first node.

28. A chip module comprising:
at least one processor including a first processing portion for communicating with a first node of a first cellular network and a second processing portion for communicating with a second node of a second cellular network,
wherein the first processing portion is configured to:
establish a first radio connection with the first node,
receive, from the first node, an uplink maximum power value associated with a second radio connection corresponding to the second node of the second cellular network,
transmit, to the second processing portion, information corresponding to the uplink maximum power value,
generate other information based on a second power value of a second signal transmitted to the first node, and
transmit, to the second processing portion, the other information, and wherein the second processing portion is configured to:
receive the information and the other information from the first processing portion, and
transmit, to the second node, a first signal having a first power value equal to or less than the uplink maximum power value based on the information and the other information, while maintaining the first radio connection.

29. The chip of claim 28, wherein the second processing portion is further configured to determine whether to transmit the first signal based on the other information.

30. The chip of claim 29, wherein the first processing portion is further configured to transmit, to the first node, a parameter indicating whether the mobile communication apparatus supports a function in which the first power value and the anothersecond power value of the second signal can be changed dependently from each other, while maintaining a radio connection with the first node.

31. A mobile communication apparatus comprising:
a first processor configured to communicate with a long term evaluation (LTE) network; and
a second processor configured to communicate with a new radio (NR) network,
wherein the first processor is configured to:
establish a first radio connection with a first node of the LTE network,
receive, from the LTE network, uplink power information, wherein the uplink power information is used to determine a maximum uplink power value to be used for signal transmission through a second radio connection corresponding to the NR network,
transmit, to the second processor, the uplink power information,
generate information based on a second power value of a second signal transmitted to the first node, and
transmit, to the second processor, the information, and
wherein the second processor is configured to:
identify the uplink power information and the information, and
transmit, to the NR network, a first signal with a first power value equal to or less than the maximum uplink power value based on the uplink power information and the information, while maintaining the first radio connection.

32. The apparatus of claim 31, wherein one of the first processor or the second processor is further configured to determine the first power value based on the second power value being used for a second signal transmission through the first radio connection.

33. The apparatus of claim 32, wherein the first processor is further configured to transmit, to the first node, a parameter indicating whether the mobile communication apparatus supports a function in which the power value and the first power value and the second power value of the second signal can be changed dependently with each other, while maintaining a radio connection with the first node.

34. The apparatus of claim 33, wherein the parameter indicates dynamic power sharing.

35. The apparatus of claim 31, wherein the second processor is further configured to determine whether to transmit the first signal based on the ether information.

36. The apparatus of claim 31, wherein the second processor is further configured not to transmit the first signal, if the first power value is less than a threshold value.

37. The apparatus of claim 31, wherein the second processor is further configured not to transmit the signal, if a difference between the power value and the first power value is less than a threshold value, based on the other information.

\* \* \* \* \*